United States Patent
Adachi et al.

(10) Patent No.: US 6,443,900 B2
(45) Date of Patent: Sep. 3, 2002

(54) ULTRASONIC WAVE TRANSDUCER SYSTEM AND ULTRASONIC WAVE TRANSDUCER

(75) Inventors: Hideo Adachi, Iruma; Katsuhiro Wakabayashi, Hachioji, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/809,680

(22) Filed: Mar. 15, 2001

(30) Foreign Application Priority Data

Mar. 15, 2000 (JP) ...................................... 2000-072854
Feb. 23, 2001 (JP) ...................................... 2001-048579

(51) Int. Cl.[7] ................................................ A61B 8/00
(52) U.S. Cl. ...................................... 600/458; 600/459
(58) Field of Search .................................. 600/437, 443, 600/447, 458–459; 310/314–317, 334, 336

(56) References Cited

U.S. PATENT DOCUMENTS

| | | | |
|---|---|---|---|
| 4,012,952 A | * 3/1977 | Dory | 73/67.7 |
| 4,138,895 A | * 2/1979 | Mezrich | 73/626 |
| 4,635,484 A | * 1/1987 | Lerch | 73/628 |
| 5,724,976 A | * 3/1998 | Mine et al. | 600/459 |
| 5,833,615 A | * 11/1998 | Wu et al. | 600/458 |

* cited by examiner

Primary Examiner—Francis J. Jaworski
(74) Attorney, Agent, or Firm—Scully, Scott, Murphy & Presser

(57) ABSTRACT

There is disclosed an ultrasonic transducer system for harmonic imaging, comprising: an ultrasonic transducer comprising a transmitting ultrasonic vibrator for transmitting a fundamental ultrasound having a center frequency $f_0$, and a receiving ultrasonic vibrator for receiving a harmonic signal having a center frequency $nf_0$ (n is an integer of 2 or more); and control means for controlling the ultrasonic transducer, wherein the transmitting ultrasonic vibrator comprises a transmitting piezoelectric resonator, the receiving ultrasonic vibrator comprises a receiving piezoelectric resonator, the transmitting and receiving piezoelectric resonators are superposed in layers and disposed, and the control mean supplies a drive signal to the transmitting piezoelectric resonator only for a time $t_1$, holds a state between electrodes of the receiving piezoelectric resonator in a low resistance state including a short circuit for a predetermined time $t_2$ ($>t_1$) after the drive signal is supplied, and holds the state between the electrodes of the transmitting piezoelectric resonator in a high resistance state including an open circuit after an elapse of the predetermined time $t_2$, until the next drive signal is supplied to the transmitting piezoelectric resonator.

47 Claims, 19 Drawing Sheets

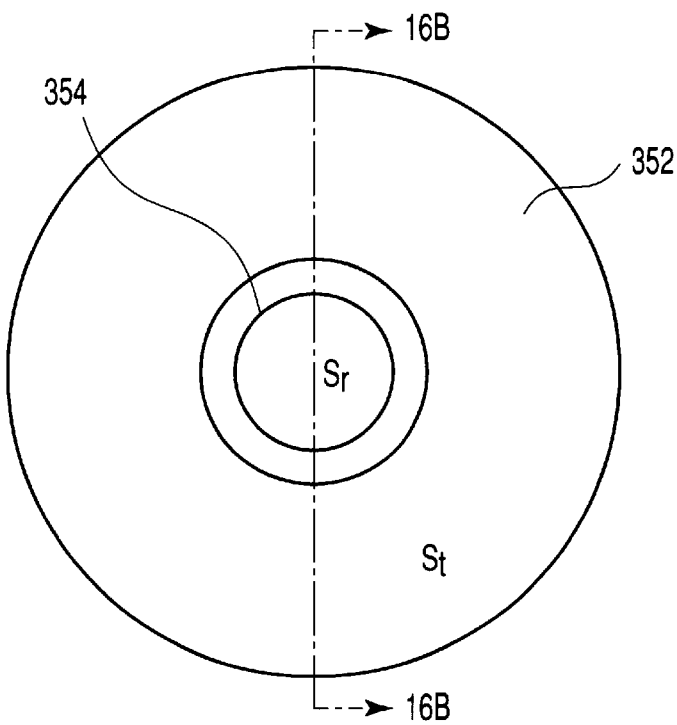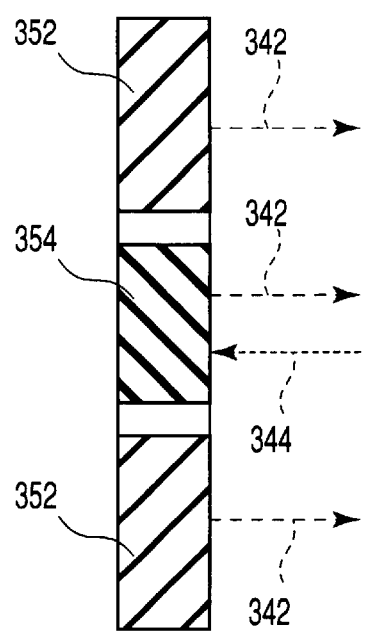
FIG. 16A    FIG. 16B
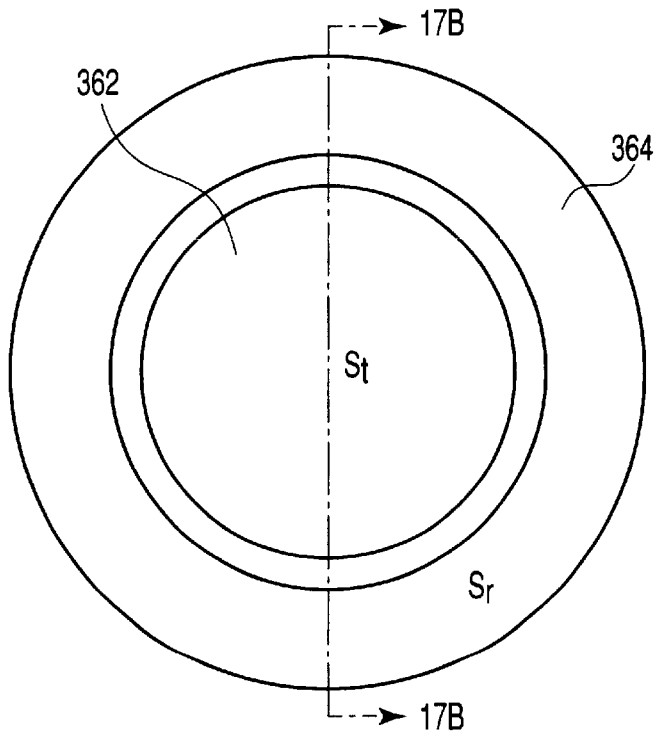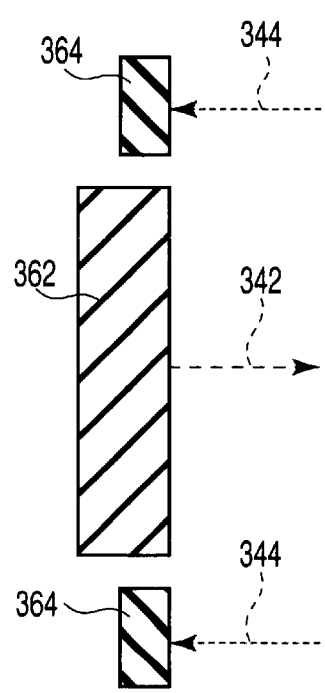
FIG. 17A    FIG. 17B

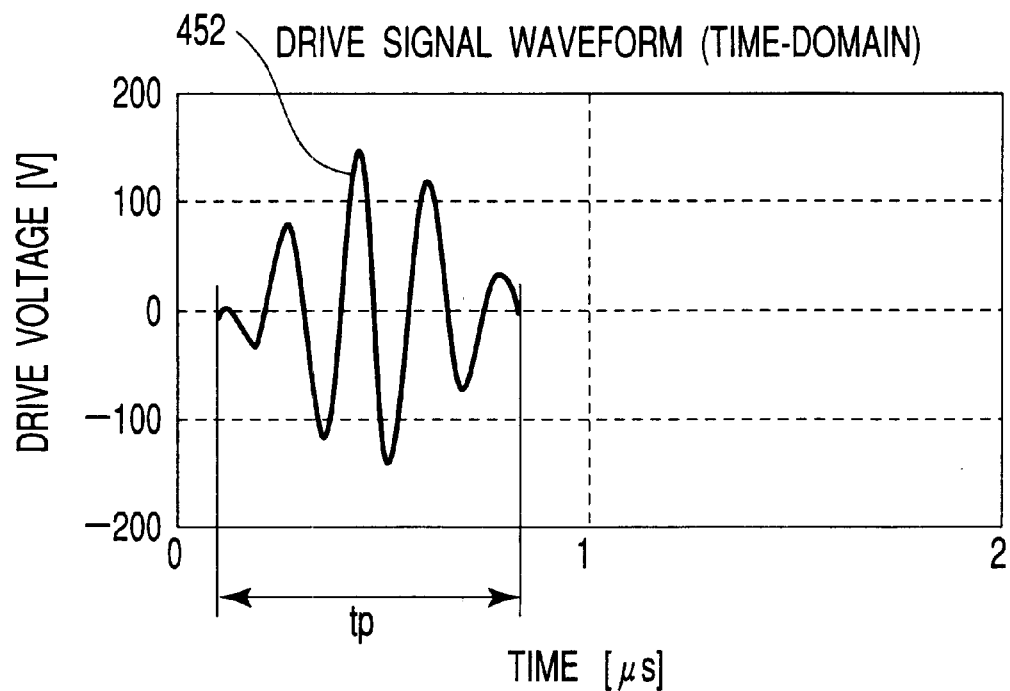
F I G. 25A
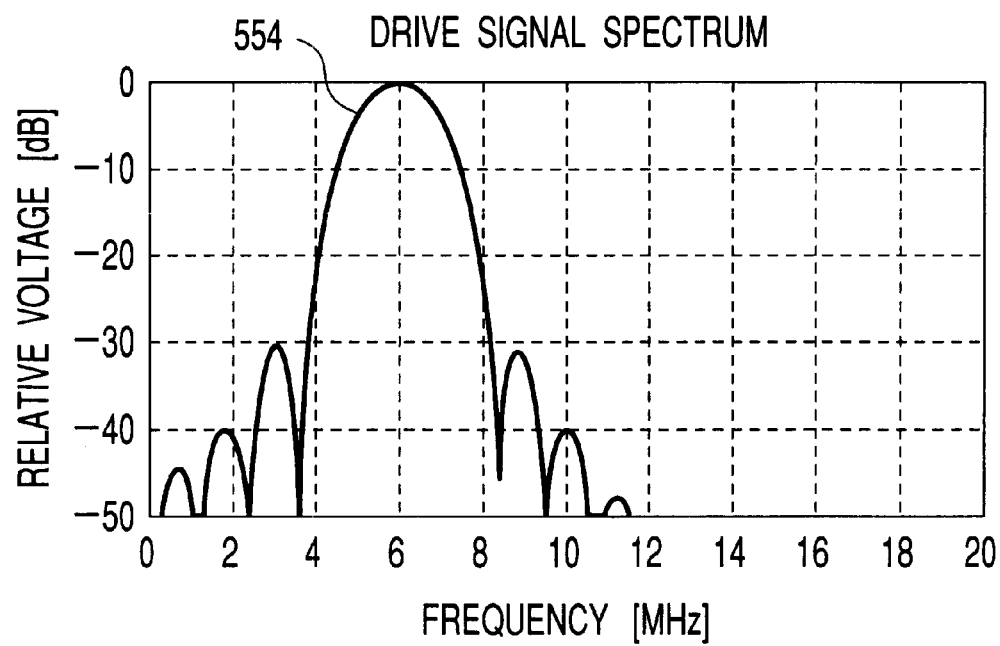
F I G. 25B

ULTRASONIC WAVE TRANSDUCER SYSTEM AND ULTRASONIC WAVE TRANSDUCER

CROSS-REFERENCE TO RELATED APPLICATIONS

This application is based upon and claims the benefit of priority from the prior Japanese Patent Applications No. 2000-072854, filed Mar. 15, 2000; and No. 2001-048579, filed Feb. 23, 2001, the entire contents of which are incorporated herein by reference.

BACKGROUND OF THE INVENTION

The present invention relates to an ultrasonic transducer and ultrasonic transducer system for use in harmonic imaging ultrasonic diagnosis, and particularly to an ultrasonic transducer which transmits a fundamental ultrasound having a center frequency $f_0$, and detects the reflected ultrasound having a center frequency $nf_0$ (n: integer of 2 or more), generated by the propagation of the fundamental ultrasound.

In recent years, harmonic imaging ultrasonic diagnosis has attracted attention. A diagnosis method is roughly classified into a contrast harmonic imaging using a contrast medium, and tissue harmonic imaging of detecting the non-linearity of an elastic property of a living tissue, and displaying the non-linearity in an image. The situation is described in detail in "special issue on electronics clinical medicine ultrasound—Latest Ultrasound—: distributed text of 1999 academic lecture by the Japan Society of Ultrasound in Medicine".

The tissue harmonic imaging is a technique of transmitting an ultrasonic pulse having a center frequency $f_0$ to a living tissue without using the ultrasonic contrast medium, extracting a high order harmonic component $nf_0$ (n being an integer of 2 or more) included in a returned echo signal, and displaying a relation between an amplitude of the component and an echo signal receiving time in a tomographic image to obtain a diagnosis image.

For an in vitro purpose, a diagnosis apparatus with the aforementioned function mounted thereon is already on the market. In the tissue harmonic imaging diagnosis method, heart structures such as a left chamber wall can be relatively clearly observed, even in an overweight person, an aged person or a person who smokes, whose echo image has been frequently blurred because of mixed noise.

The ultrasonic diagnosis method is at present used only for the in vitro purpose, and a second order high harmonic wave (n=2), that is, the ultrasound having a center frequency of $2f_0$ is used. In a conventional ultrasonic transducer, transmission of the ultrasound having a center frequency $f_0$ and reception of the ultrasound having a center frequency $2f_0$ are performed by the same ultrasonic vibrator. Therefore, the ultrasonic vibrator used needs to have a remarkably broad band.

Moreover, to further enhance the resolution, utilization of a third order harmonic signal is expected, but an ultra-broad band ultrasonic vibrator which can detect an ultrasound having a center frequency of $3f_0$, that is, a third order harmonic signal has not been realized yet.

It is usually said that the sensitivity of a second order harmonic signal is deteriorated by 15 to 20 dB, and a third order harmonic signal is further deteriorated by 15 to 20 dB as compared with the fundamental frequency signal. Therefore, the aforementioned sensitivity deterioration with the broadened band disadvantageously causes further deterioration of the diagnosis image.

Furthermore, since the transmission of the ultrasound having the center frequency $f_0$ and the reception of the ultrasound having the center frequency $2f_0$ are performed by the same ultrasonic vibrator, a fundamental wave and various unnecessary vibrations are unavoidably superimposed onto a received ultrasonic signal.

To improve such disadvantages, Jpn. Pat. Appln. KOKAI Publication No. 11-155863 discloses an ultrasonic transducer which has a transmitting piezoelectric resonator and receiving piezoelectric resonator in one case which can efficiently receive the high order harmonic component. A constitution of the ultrasonic transducer is shown in FIG. 31.

As shown in FIG. 31, an ultrasonic transducer 1000 has a transmitting piezoelectric resonator 1002, and a receiving polymer piezoelectric resonator 1004 disposed in front of the transmitting piezoelectric resonator. The receiving polymer piezoelectric resonator 1004 and transmitting piezoelectric resonator 1002 are layered and disposed via an acoustic matching layer 1006.

Front electrodes of the transmitting piezoelectric resonator 1002 and receiving polymer piezoelectric resonator 1004 are both connected to a grounding lead wire 1008 and are kept at a ground potential. A back-side electrode of the transmitting piezoelectric resonator 1002 is connected to a transmitting shielding wire 1010, and a drive signal is supplied via the wire. A back-side electrode of the receiving polymer piezoelectric resonator 1004 is connected to a receiving shielding wire 1012, and a received signal is extracted via the wire.

The transmitting piezoelectric resonator 1002 has a resonant frequency or an antiresonant frequency which agrees with a resonant frequency of the ultrasonic contrast medium or a frequency having a specific relation with respect to the ultrasonic contrast medium. On the other hand, the receiving polymer piezoelectric resonator 1004 is a non-resonating piezoelectric resonator, and can receive even the high order harmonic component generated based on the nonlinear behavior of the ultrasonic contrast medium.

Since the acoustic matching layer 1006 is disposed between the transmitting piezoelectric resonator 1002 and the receiving polymer piezoelectric resonator 1004 in the ultrasonic transducer 1000, only a portion with the ultrasonic contrast medium present therein, such as a blood vessel in a human body and a cancer tissue with capillary concentrated on a peripheral portion thereof, can be depicted more clearly than other portions.

Since the ultrasonic transducer 1000 has separate transmitting and receiving piezoelectric resonators, the band is easily broadened, and properties suitable for harmonic imaging are expected to be displayed, as compared with the conventional ultrasonic transducer for general use for performing transmission/reception with the single piezoelectric resonator.

However, in the conventional ultrasonic transducer shown in FIG. 31, the transmitting and receiving ultrasonic vibrators are superposed and disposed. Therefore, when a transmitted ultrasonic wave is passed through the receiving ultrasonic vibrator, the ultrasonic wave excites the receiving ultrasonic vibrator and is modulated by the vibration. As a result, undesired vibration of the resonant frequency of a receiving ultrasonic vibrator film is mixed in with the transmitted ultrasonic wave. This means that it is impossible to judge whether the signal detected by the receiving ultrasonic vibrator is the high order harmonic signal from the ultrasonic contrast medium or the signal mixed during transmission. Therefore, the mixture of the undesired vibration causes a large deterioration of the resolution.

Moreover, for use in a so-called tissue harmonic imaging (THI) for detecting a nonlinear ultrasonic wave generated with propagation of the fundamental ultrasonic wave in the living tissue, the high order harmonic wave needs to be securely selected and detected, because a sound pressure level of the nonlinear ultrasonic wave generated with the propagation of the fundamental ultrasound in the living tissue is as small as about −20 dB, as is well known. However, in the conventional ultrasonic transducer shown in FIG. 31, since the receiving ultrasonic vibrator has a non-resonating broad-band property, also for the received signal, the high order harmonic signal level is −20 dB lower with respect to the fundamental wave and such a situation is unchanged.

BRIEF SUMMARY OF THE INVENTION

An object of the present invention is to provide a technique of an ultrasonic transducer which has a transmitting piezoelectric resonator and receiving piezoelectric resonator contained in the same case, but which can detect a harmonic signal with a high sensitivity without being adversely affected by resolution deterioration caused by residual vibration.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 16A is a front view of the piezoelectric resonator of the ultrasonic transducer for detecting only a fundamental ultrasound as a comparison object of the third embodiment, and FIG. 16B is a sectional view taken along line 16B—16B of FIG. 16A.

FIG. 17A is a front view showing models of the transmitting piezoelectric resonator and receiving piezoelectric resonator in the in-plane separated ultrasonic transducer according to the modification of the third embodiment, and FIG. 17B is a sectional view taken along line 17B—17B of FIG. 17A.

FIG. 25A shows the drive voltage waveform of a burst wave as still another example of the drive signal supplied to the transmitting piezoelectric resonator, and FIG. 25B shows the frequency characteristic of the wave.

DETAILED DESCRIPTION OF THE INVENTION

[First Embodiment]

According to a first embodiment, there is provided an ultrasonic transducer system suitable for harmonic imaging ultrasonic diagnosis. The system includes an ultrasonic transducer and a control system of the ultrasonic transducer. First the ultrasonic transducer and next the control system will be described hereinafter.

Figure 1:
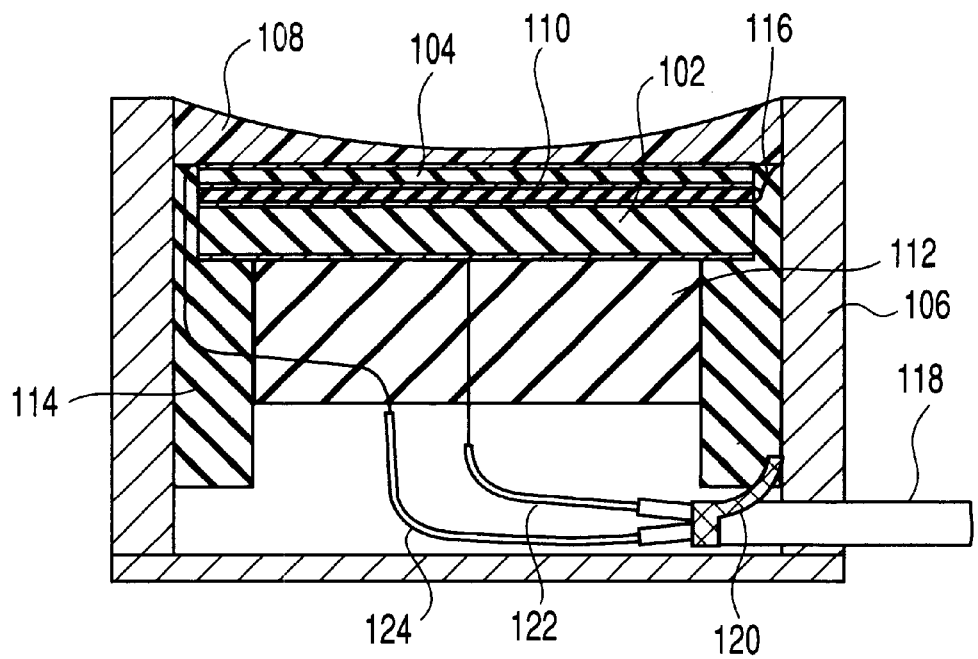
FIG. 1 shows a side section of an ultrasonic transducer in a first embodiment.

As shown in FIG. 1, the ultrasonic transducer has a transmitting piezoelectric resonator 102, receiving piezoelectric resonator 104, housing 106 for containing these piezoelectric resonators 102, 104, and acoustic lens 108.

The transmitting piezoelectric resonator 102 has a piezoelectric material such as lead zirconium titanate (PZT), bismuth layer structure and another piezoelectric ceramic material, and crystal, lithium niobate, PZT and another single crystal piezoelectric material. The transmitting piezoelectric resonator also has a pair of electrodes disposed opposite each other via the piezoelectric material.

The transmitting piezoelectric resonator 102 and receiving piezoelectric resonator 104 are layered via an acoustic matching layer 110, that is, laminated and disposed. A damping layer (backing layer) 112 is disposed on a back surface of the transmitting piezoelectric resonator 102.

In such a laminate structure, the transmitting piezoelectric resonator 102, acoustic lens 108 and backing layer 112 constitute a transmitting ultrasonic vibrator, and the receiving piezoelectric resonator 104, acoustic lens 108 and backing layer 112 constitute a receiving ultrasonic vibrator. The transmitting and receiving ultrasonic vibrators include the acoustic lens 108 and backing layer 112 in common.

The laminate structure including the transmitting piezoelectric resonator 102, receiving piezoelectric resonator 104, acoustic lens 108 and backing layer 112 is fixed into the housing 106 via an insulating layer 114 lined on an inner surface of the housing 106. The insulating layer 114 insulates the electrodes of the piezoelectric resonators 102, 104. The acoustic lens 108 is disposed in front of the receiving piezoelectric resonator 104.

The electrode on an ultrasonic emission side of the transmitting piezoelectric resonator 102 and the electrode on a side opposite to the ultrasonic emission side of the receiving piezoelectric resonator 104 are electrically connected to the housing 106 via a wiring 116, and are held at the same potential as that of the housing 106. A two-core coaxial cable 118 has a lead wire 122 electrically connected to the electrode on the side opposite to the ultrasonic emission side of the transmitting piezoelectric resonator 102, a lead wire 124 electrically connected to the electrode on the ultrasonic emission side of the receiving piezoelectric resonator 104, and a shielding wire 120 electrically connected to the housing 106.

The transmitting piezoelectric resonator 102 has a resonant frequency $f_0$, and the receiving piezoelectric resonator 104 has a resonant frequency $nf_0$ (n being an integer of 2 or more). For example, the transmitting piezoelectric resonator 102 has a resonant frequency of 5 MHz, and the receiving piezoelectric resonator 104 has a resonant frequency of 10 MHz. The resonant frequencies of the piezoelectric resonators 102, 104 can be adjusted by controlling a vibrator thickness.

The receiving piezoelectric resonator 104 is formed by a method of bonding a piezoelectric polymeric film having a polarized state with an adhesive beforehand. However, the transmitting piezoelectric resonator is sometimes cracked or damaged by a bonding pressure, influence of a bubble, or the influence of an adhesive layer. There is also a case in which the designed properties cannot steadily be obtained due to the adhesive layer having a non-uniform thickness. In this case, it is preferable to form a piezoelectric polymer layer in which surface energy poling is possible. This method is described in detail in document "Junya IDE et al: Jpn. J. Appl. Phys. Vol. 38 (1999) pp. 2049 to 2052", which is incorporated herein by reference. This method includes: forming a polymeric material, such as polycyanophenyl sulfide, into a film on the electrode formed on the surface of the acoustic matching layer 110, and forming an upper electrode after the film is cured. After the film is formed, the polarized state can be spontaneously realized by a surface energy effect without especially performing a polarizing treatment. Since the film can be formed by spin coating or the like, a target structure can be easily realized as compared with the method of bonding the piezoelectric polymeric film by adhesive. The polymeric material is dropped on the electrode (not shown) formed on the surface of the acoustic matching layer 110, the electrode is spin-coated at an appropriate revolution number, the upper electrode is further formed after the film is cured, and the receiving piezoelectric resonator 104 is thus formed.

The acoustic lens 108 has an acoustic opening surface having a concave surface shape. The opening surface has a constant curvature radius. That is, the opening surface has a part of a spherical surface.

Figure 5A:
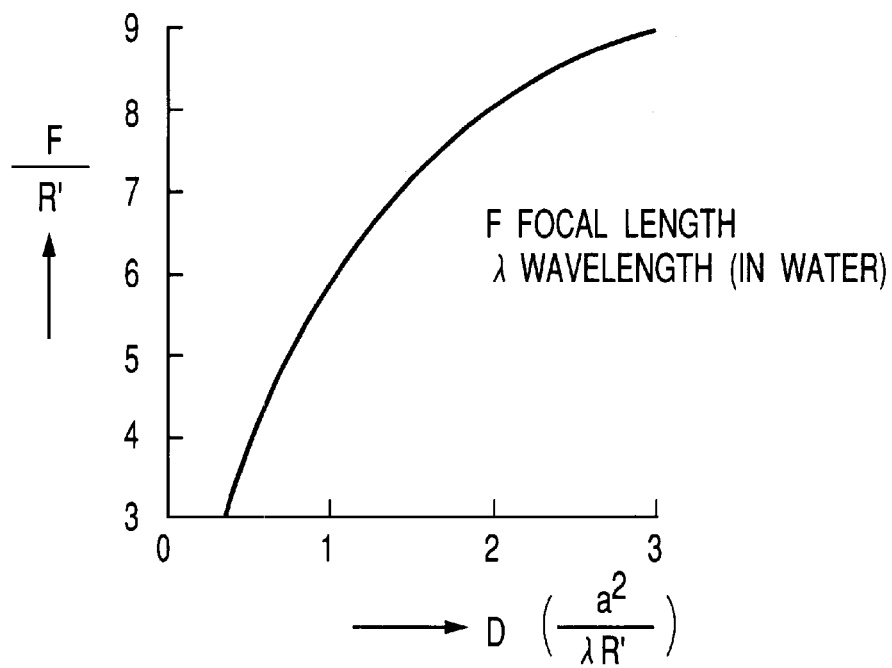
FIG. 5A is a graph showing a relation between a curvature radius of an acoustic lens disposed in front of a disc piezoelectric resonator, and a focal length F in an ultrasonic propagation medium of water.

Setting of the curvature radius of the spherical surface of the acoustic lens 108 will next be described with reference to FIG. 5A and FIG. 5B. FIG. 5A shows a relation between a curvature radius R of the acoustic lens disposed in front of a disc piezoelectric resonator, and a focal length F in an ultrasonic propagation medium of water. Here, the abscissa indicates D ($=a^2/\lambda R'$, a: opening radius, $\lambda$: wavelength in the material in which the ultrasonic wave is propagated, R': R'=2.25 R at a lens apparent curvature radius, R: processing curvature radius of the acoustic lens), and the ordinate indicates F/R'. This is a relation derived from a well-known Rayleigh equation.

Figure 5B:
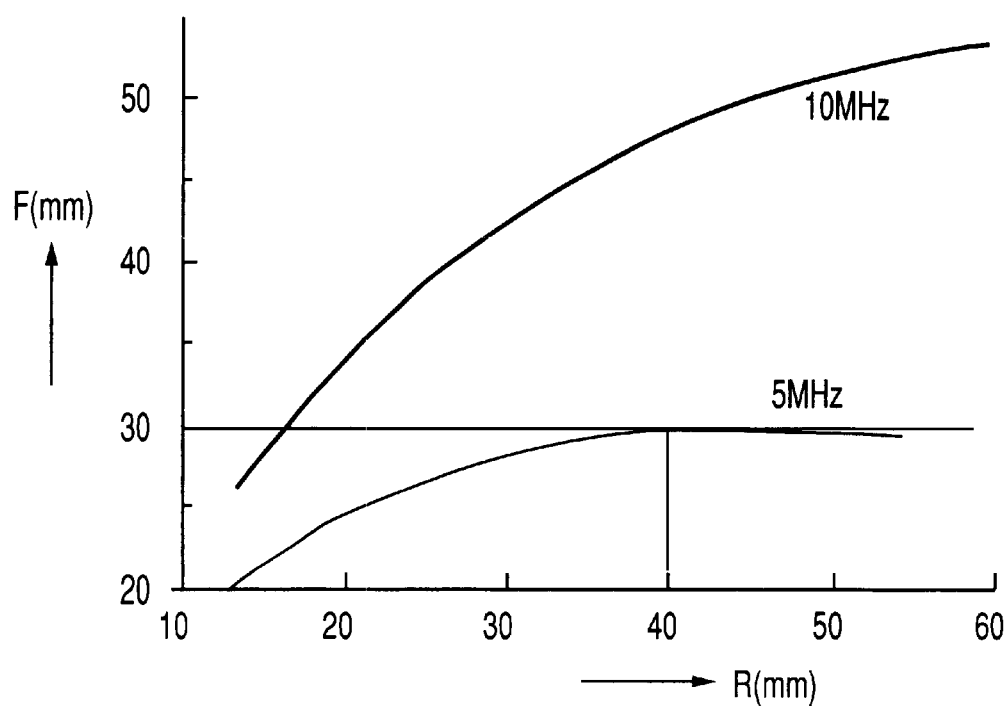
FIG. 5B is a graph showing a relation between a focus and the acoustic lens curvature radius for 5 MHz and 10 MHz.

FIG. 5B further shows a relation between the focal length and an actual processing curvature radius of the acoustic lens for 5 MHz and 10 MHz. It is seen from FIG. 5B that to adjust a focus in the same position, for example, a 30 mm position in any frequency, different curvature radii, for example, 16 mm for 10 MHz and 40 mm for 5 MHz are preferably set.

However, since the opening surface for transmitting/receiving the ultrasonic wave is actually shared, the curvature radius of the opening surface of the acoustic lens 108 has an intermediate value or an average value between these curvature radii, for example, a value of 25 mm, and an optimum focus image forming state is realized. In other words, the curvature radius of the opening surface of the acoustic lens 108 has a value equal to an average value of an acoustic focal length for the ultrasound having a center frequency $f_0$ and an acoustic focal length for the ultrasound having a center frequency $nf_0$ (n being an integer of 2 or more).

Additionally, the opening surface of the acoustic lens 108 may have a partially different curvature radius. For example, the curvature radius of an opening surface center portion may have a value optimum for reception, that is, a value equal to the acoustic focal length for the ultrasound having the center frequency $nf_0$, and the curvature radius of a peripheral portion may have a value optimum for transmission, that is, a value equal to the acoustic focal length for the ultrasound having the center frequency $f_0$ (vice versa).

A case in which a harmonic signal of 10 MHz is generated during transmission has been described above, but in actuality the harmonic signal is gradually generated with a propagation distance of the ultrasonic wave by non-linearity of an elastic coefficient of an organism. Therefore, the focus of the harmonic received signal is not so remote as described above. However, since the signal focus becomes far from a focus in a fundamental frequency with a degree of the harmonic signal, deviation of both focuses accordingly increases, and improvement of an ultrasonic image resolution by harmonics imaging is eliminated.

A control system of transmission/reception of the aforementioned ultrasonic transducer will next be described with reference to FIG. 6A and FIG. 6B.

Figures 6A, 6B:
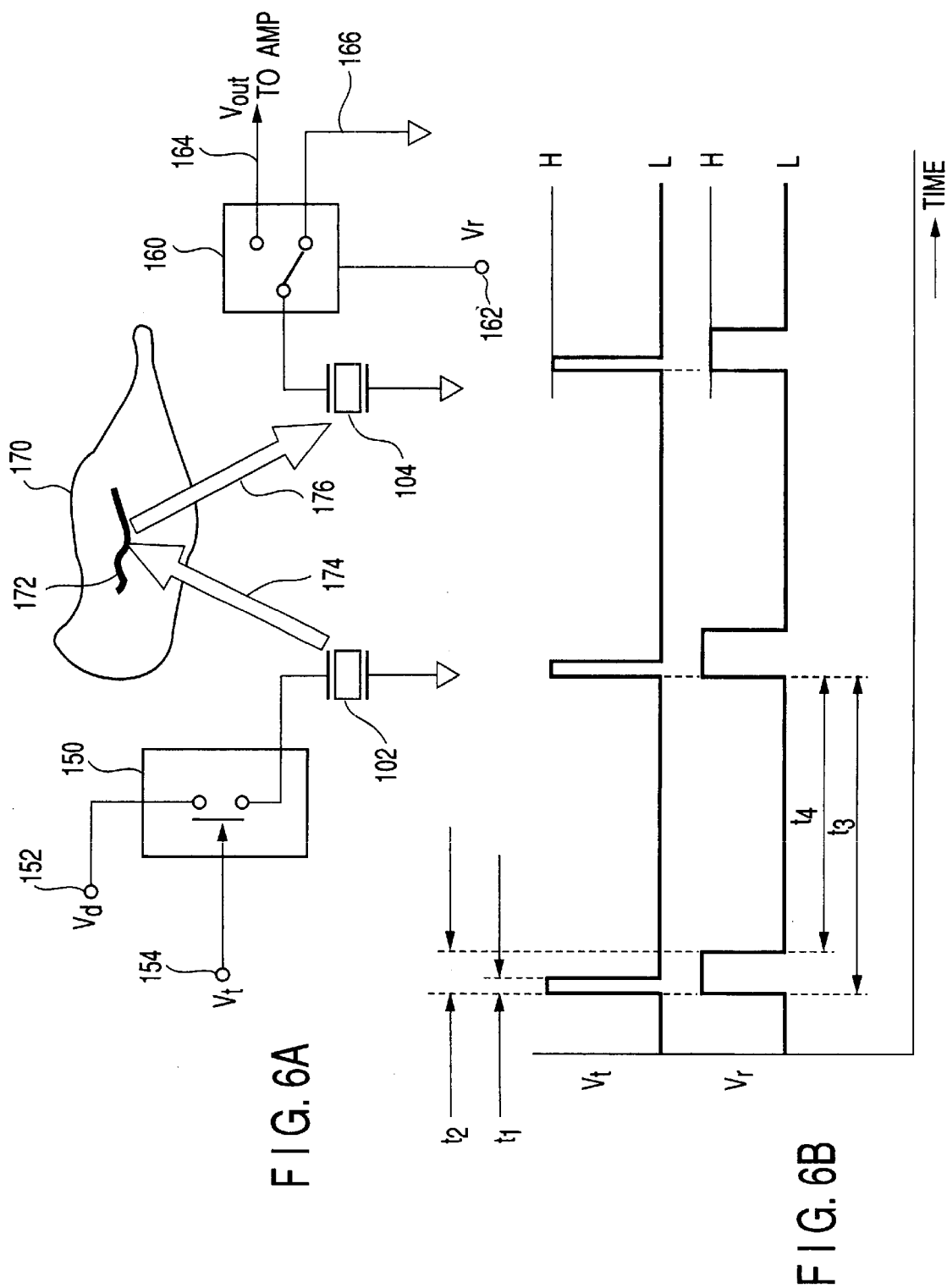
FIG. 6A schematically shows a constitution of a control system for controlling transmission/reception of the ultrasonic transducer shown in FIG. 1.
FIG. 6B shows a timing chart of control signals $V_t$ and $V_r$ inputted to an on/off control device and selector shown in FIG. 6A.

FIG. 6A schematically shows a constitution of the control system. As shown in FIG. 6A, the control system has an on/off control device 150 for controlling the transmitting piezoelectric resonator 102, and a selector 160 for controlling a signal flow of the receiving piezoelectric resonator 104. The on/off control device 150 supplies a high voltage $V_d$ supplied via a terminal 152 to the transmitting piezoelectric resonator 102 in response to a control signal $V_t$ inputted via a terminal 154. The selector 160 leads the received signal of the receiving piezoelectric resonator 104 to either a branch 164 connected to an amplifier or a grounded branch 166 in response to a control signal $V_r$ inputted via a terminal 162.

FIG. 6B shows a timing chart of the control signals $V_t$ and $V_r$ inputted to the on/off control device 150 and selector 160. It is seen from the timing chart that at a period $t_3$, a pulse with a pulse width $t_1$ is inputted to the terminal 154 of the on/off control device 150, and a pulse with a pulse width $t_2$ ($>t_1$) is inputted to the terminal 162 of the selector 160.

In response to an input of the pulse with the pulse width $t_1$, a transmission ultrasonic wave is transmitted from the transmitting ultrasonic transducer. This transmission ultrasonic wave periodically generates a surface charge with a polarity which restricts deformation in a receiving ultrasonic transducer when the ultrasonic wave is transmitted through the receiving ultrasonic transducer disposed in front of the transmitting ultrasonic transducer.

This charge generates an electric field in the piezoelectric resonator in a direction in which a change of the polarized state is restricted, and a state in which mechanical displacement does not easily occur, that is, a stiff state is induced by an inverse piezoelectric effect. On the other hand, when the surface charge is discharged by an external circuit, the electric field of the direction restricting the polarized state change is not generated. As a result, the stiff state is not induced.

That is, a difference appears in stiffness of the piezoelectric resonator with a way of processing the charge generated between the electrodes of the piezoelectric resonator. This phenomenon is a peculiar phenomenon which occurs in the piezoelectric resonator. The stiffness of the piezoelectric resonator is generally represented by $c^E$ (electric field 0) and $c^D$ (electric displacement 0). This is a well known phenomenon having the following relation:

$$c^E = (1-K^2)c^D$$

(K: electromechanical coupling coefficient)

When the piezoelectric resonator with the ultrasound transmitted therethrough is sufficiently thick compared to the wavelength of ultrasounds, generation of a surface charge has little influence. However, a large influence is exerted when the thickness of the piezoelectric resonator is of the order of $\frac{1}{4}\lambda$ as in the present embodiment.

Figure 8:
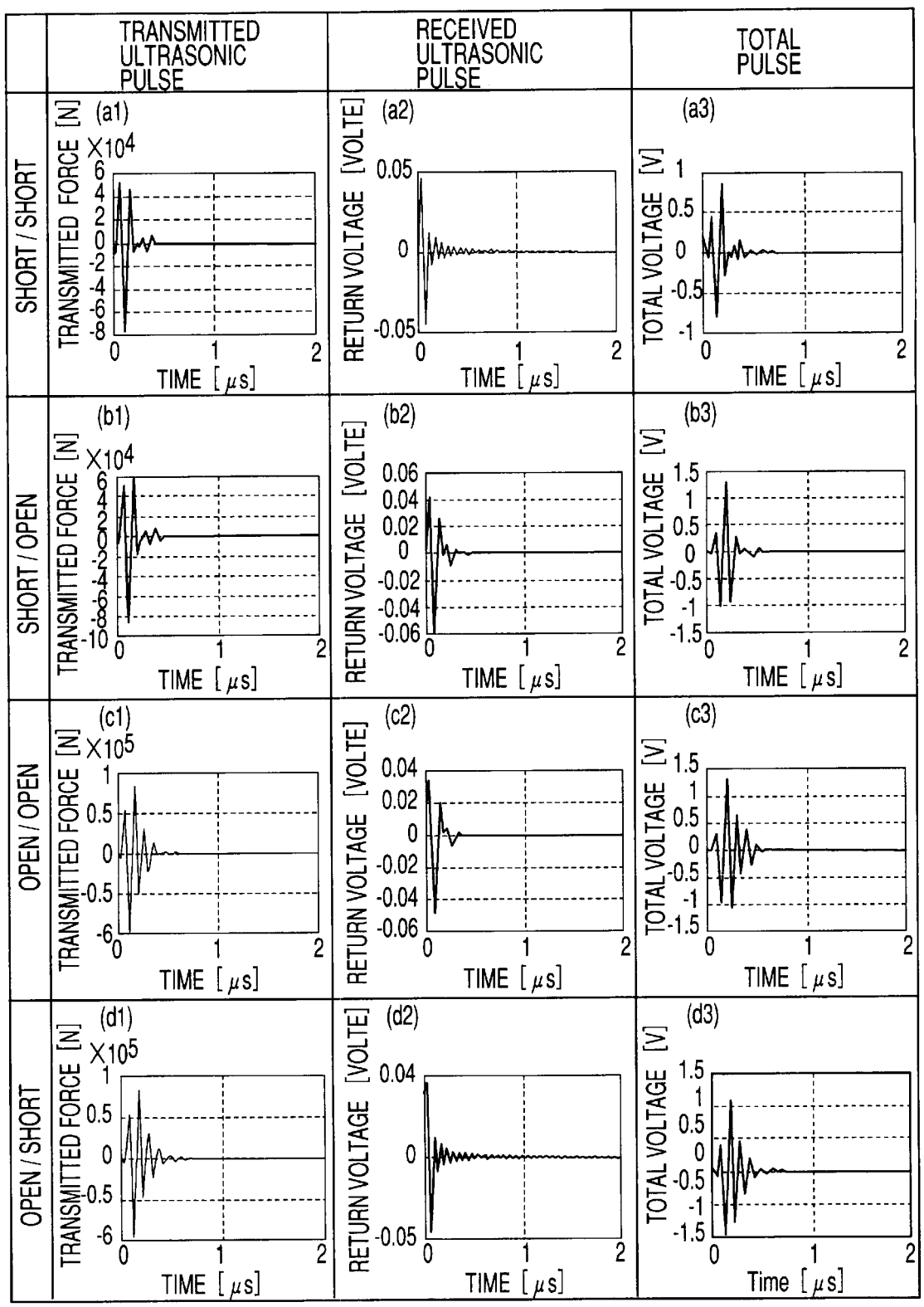
FIG. 8 shows a listing of simulation results obtained by calculating an effect of a surface charge generated in the piezoelectric resonator through which an ultrasound is transmitted.

FIG. 8 lists simulation results obtained by calculating the influence. In FIG. 8, rows indicate only a transmitted ultrasonic pulse (left row), only a received ultrasonic pulse (middle row), and a total transmitted and received ultrasonic pulse (right row), and lines indicate a charge processing state between the electrodes of the receiving piezoelectric resonator 104 during transmission, and a charge processing state between the electrodes of the transmitting piezoelectric resonator 102 during reception.

That is, (a1), (a2), (a3) indicate the transmitted ultrasonic pulse, received ultrasonic pulse, and actual ultrasonic pulse while the electrodes of the receiving piezoelectric resonator 104/transmitting piezoelectric resonator 102 are in a short/short state. Similarly, (b1), (b2), (b3) indicate the transmitted ultrasonic pulse, received ultrasonic pulse, and actual ultrasonic pulse in a short/open state, (c1), (c2), (c3) indicate the pulses in an open/open state, and (d1), (d2), d3) indicate the pulse in an open/short state.

It is apparent from FIG. 8 that a residual vibration appears from (a2) and (d2) in short/short and open/short states, and this method cannot be said to be a preferable charge processing method between the electrodes. Additionally, the short state is a low resistance state including short circuit, and the open state is a high resistance sate including open circuit.

Characteristic values of pulse waveforms, that is, a pulse maximum amplitude (Vpp), center frequency (CF) and 31 20 dB pulse width (PW) are shown in Table 1.

TABLE 1

| | | Transmitter property | | | Receiver property | | | Transmitter/receiver total property | | |
|---|---|---|---|---|---|---|---|---|---|---|
| Transmitter terminal | Receiver terminal | Force N | CF MHz | PW μs | Vpp V | CF MHz | PW μs | Vpp V | CF MHz | PW μs |
| 1 Short | Short | 7 × 10⁴ | 7.44 | 0.219 | 0.078 | 9.91 | 0.234 | 0.647 | 7.81 | 0.358 |
| 2 Short | Open | 13 × 10⁴ | 9.58 | 0.195 | 0.086 | 8.19 | 0.266 | 1.89 | 8.63 | 0.234 |
| 3 Open | Open | 17 × 10⁴ | 9.91 | 0.328 | 0.069 | 7.44 | 0.297 | 1.862 | 9.16 | 0.398 |
| 4 Open | Short | 17 × 10⁴ | 9.91 | 0.329 | 0.09 | 10.59 | 0.258 | 1.96 | 10.13 | 0.258 |

Based on a general view that a large Vpp and small PW of the transmitter/receiver total property result in a broad band and high sensitivity, it is seen from the table that the charge processing method between the electrodes in the short/open state is most preferable. That is, it is most preferable to control the state between the electrodes of the receiving piezoelectric resonator 104 to be short during transmission of the fundamental ultrasound, and to control the state between the electrodes of the transmitting piezoelectric resonator 102 to be open during receiver. This phenomenon is basically different in principle from an effect obtained by disposing the acoustic matching layer 110 in a boundary of the transmitting piezoelectric resonator 102 and receiving piezoelectric resonator 104.

Operation of the present embodiment will next be described with reference to FIG. 6A and FIG. 6B.

In the on/off control device 150, a direct-current voltage $V_d$ is supplied to the terminal 152, and the control signal $V_r$ with a controlled pulse width is inputted to the terminal 154. The control signal $V_t$ is a rectangular wave, impulse wave, or the like, and is, for example, a rectangular wave having a period $t_3$ and pulse width $t_1$ as shown in FIG. 6B. The transmitting piezoelectric resonator 102 generates an ultrasonic pulse 174 for a pulse waveform of the inputted control signal $V_t$.

The ultrasonic pulse 174 has a center frequency $f_0$, and is propagated in a living tissue 170 and reflected by an acoustically discontinuous boundary surface 172. This pulse forms an echo signal 176 including a relatively large amount of harmonic signals having a frequency $nf_0$ (n being an integer of 2 or more) due to non-linearity of an elastic property of the organism, and the echo signal is received by the receiving piezoelectric resonator 104. Moreover, when a non-linear medium (contrast medium) is injected beforehand in the living tissue 170, the transmitted ultrasonic pulse 174 forms an echo signal including a large amount of harmonic components generated from the non-linear medium. Since the receiving piezoelectric resonator 104 has a resonant frequency having frequency $nf_0$ (n being an integer of 2 or more) as the center frequency, the harmonic signal is selectively received and converted to an electric signal.

The selector 160 leads the received signal of the receiving piezoelectric resonator 104 to either the branch 164 or the branch 166 in response to the control signal $V_r$ inputted to the terminal 162. The control signal $V_r$ is synchronized with the control signal $V_t$ which is a rectangular wave having a pulse width $t_2$ with the same period as the period $t_3$ of the control signal $V_t$. The selector 160 leads the received signal to the grounded branch 166 for time $t_2$ corresponding to "H", and leads the received signal to the branch 164 connected to a subsequent signal processor such as an amplifier for time $t_4=t_3-t_2$ corresponding to "L".

The pulse width $t_2$ of the control signal $V_r$ is set to be longer than the pulse width $t_1$ of the control signal $V_t$, and this corresponds to a time when the ultrasonic wave generated in at least the transmitting piezoelectric resonator 102 is completely transmitted through the receiving piezoelectric resonator 104.

The control signal $V_r$ inputted to the terminal 162 changes to "L" at a timing at which the echo signal 176 is received by the receiving piezoelectric resonator 104, and a received signal Vout from the receiving piezoelectric resonator 104 is led to the subsequent signal processor such as the amplifier.

As described above, it is preferable to control the state between the electrodes of the transmitting piezoelectric resonator 102 during reception to be an open state or a nearly open state. While the echo signal 176 is received by the receiving piezoelectric resonator 104, the control signal $V_r$ is of "L", and the state between the electrodes of the transmitting piezoelectric resonator 102 is kept to be substantially in the open state.

In the control, instead of transformer coupling, a control device in which output resistance is small in an on state and large in an off state and a large output voltage can be obtained is preferably used in a final stage of a transmission drive circuit. For example, a high-speed power MOSFET whose output voltage is large is suitable for the control device.

Additionally, since a polymeric piezoelectric material constituting the receiving piezoelectric resonator 104 has a large voltage output coefficient $g_{33}$, reception sensitivity is high. On the other hand, since a mechanical quality factor Qm is small, a selection property for the received frequency is small. Then, in order to improve the selection property, inductance is effectively connected in parallel with the receiving piezoelectric resonator 104 in some case. Moreover, since a composite piezoelectric material has a mechanical quality factor Qm larger than the mechanical quality factor Qm of the polymeric piezoelectric material, and has a relatively large selection property, the composite piezoelectric material is further preferable.

Modifications of the present embodiment will be described hereinafter with reference to the drawings. In the drawings, members equivalent to the aforementioned members are denoted with the same reference numerals, and a detailed description thereof is omitted to avoid redundancy in the following description.

Figure 2:
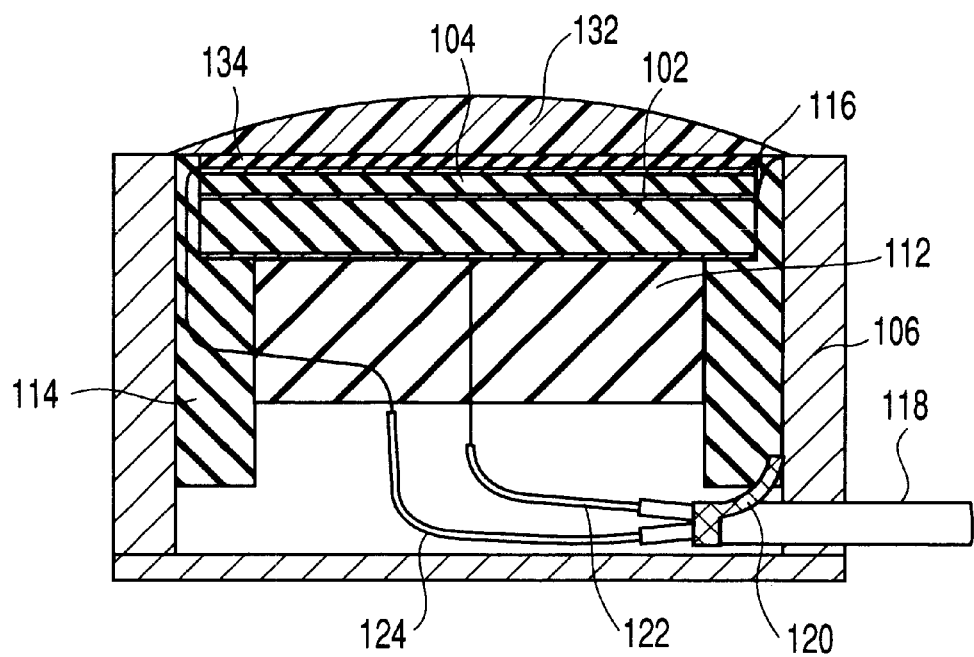
FIG. 2 shows a side section of a first modification of the ultrasonic transducer in the first embodiment.

FIG. 2 shows a first modification of the ultrasonic transducer. The ultrasonic transducer of the present modification has an acoustic lens 132 having a convex opening surface, and a buffer layer 134 disposed between the acoustic lens 132 and the receiving piezoelectric resonator 104. The acoustic lens 132 having the convex opening surface is suitable for a case in which a sound velocity of a lens material is lower than a sound velocity of 1500 m/sec of the living tissue. The buffer layer 134 improves a bonding property between the acoustic lens 132 and the receiving piezoelectric resonator 104.

In the present modification, the acoustic matching layer 110 in FIG. 1 is not disposed between the transmitting piezoelectric resonator 102 and the receiving piezoelectric resonator 104, but the acoustic matching layer is further preferably disposed between the transmitting piezoelectric resonator 102 and the receiving piezoelectric resonator 104. Since a silicone resin for use as a material of the acoustic lens 132 generally has a bad adhesion to another resin material, the acoustic lens 132 may be bonded to the receiving piezoelectric resonator 104 after heating and bonding a polyimide resin film as the buffer layer beforehand.

Figure 3:
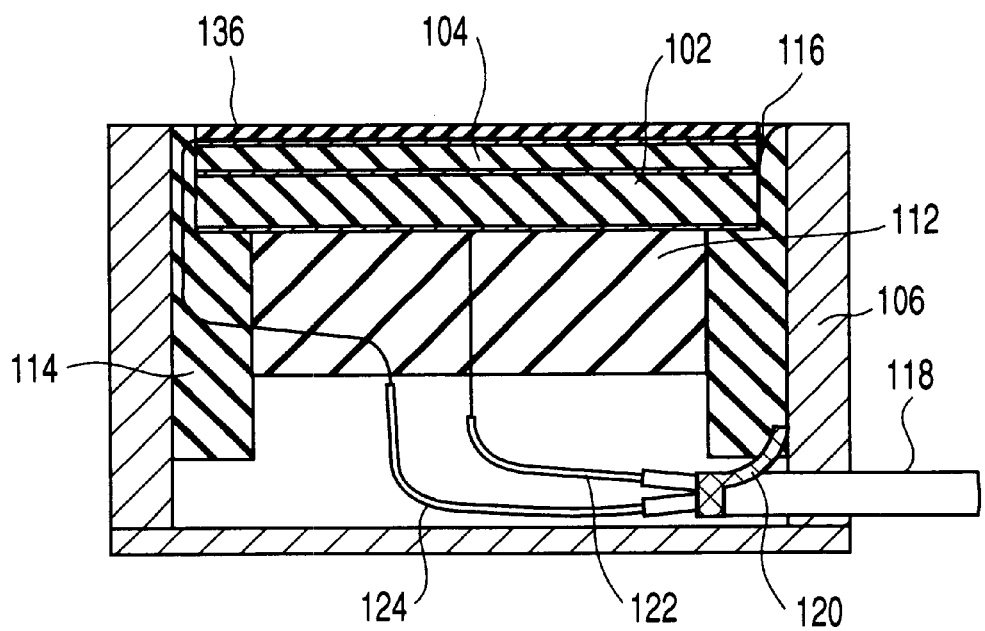
FIG. 3 shows a side section of a second modification of the ultrasonic transducer in the first embodiment.

FIG. 3 shows a second modification of the ultrasonic transducer. The ultrasonic transducer of the present modification does not have the acoustic lens, and an only insulating layer 136 is formed in front of the receiving piezoelectric resonator 104. The ultrasonic transducer is suitable for a use in which a transverse resolution does not matter very much, and this ultrasonic transducer can advantageously be presented inexpensively. Also in the present modification example, it is further preferable to dispose the acoustic matching layer between the transmitting piezoelectric resonator 102 and the receiving piezoelectric resonator 104.

Figure 4:
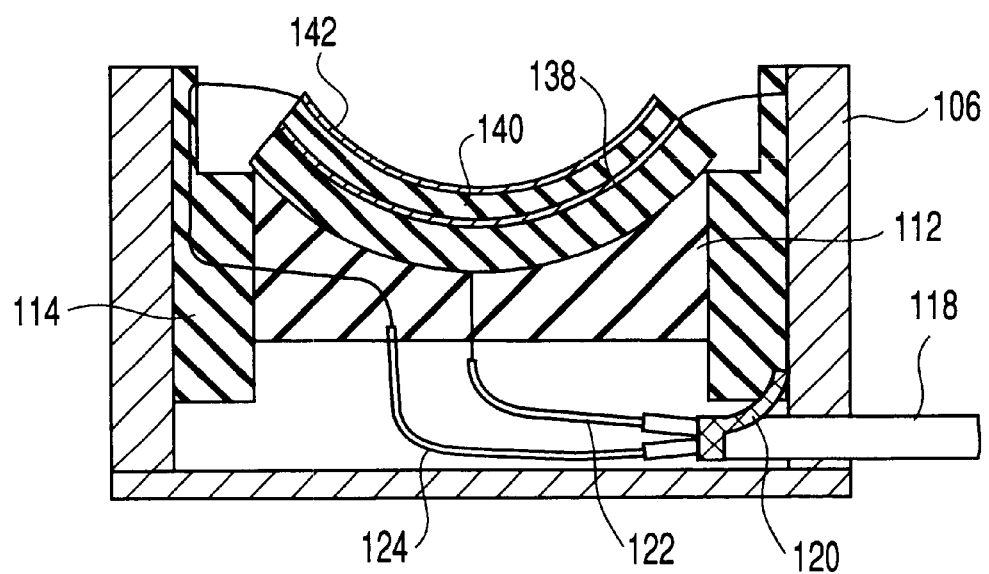
FIG. 4 shows a side section of a third modification of the ultrasonic transducer in the first embodiment.

FIG. 4 shows a third modification of the ultrasonic transducer. In the ultrasonic transducer of the present modification example, a transmitting piezoelectric resonator 138, receiving piezoelectric resonator 140 and insulating layer 142 are bent in a concave shape. By this structural characteristic, the ultrasonic transducer can converge the ultrasound without any acoustic lens. Also in the present modification example, it is further preferable to dispose the acoustic matching layer between the transmitting piezoelectric resonator 138 and the receiving piezoelectric resonator 140.

Figures 7A, 7B:
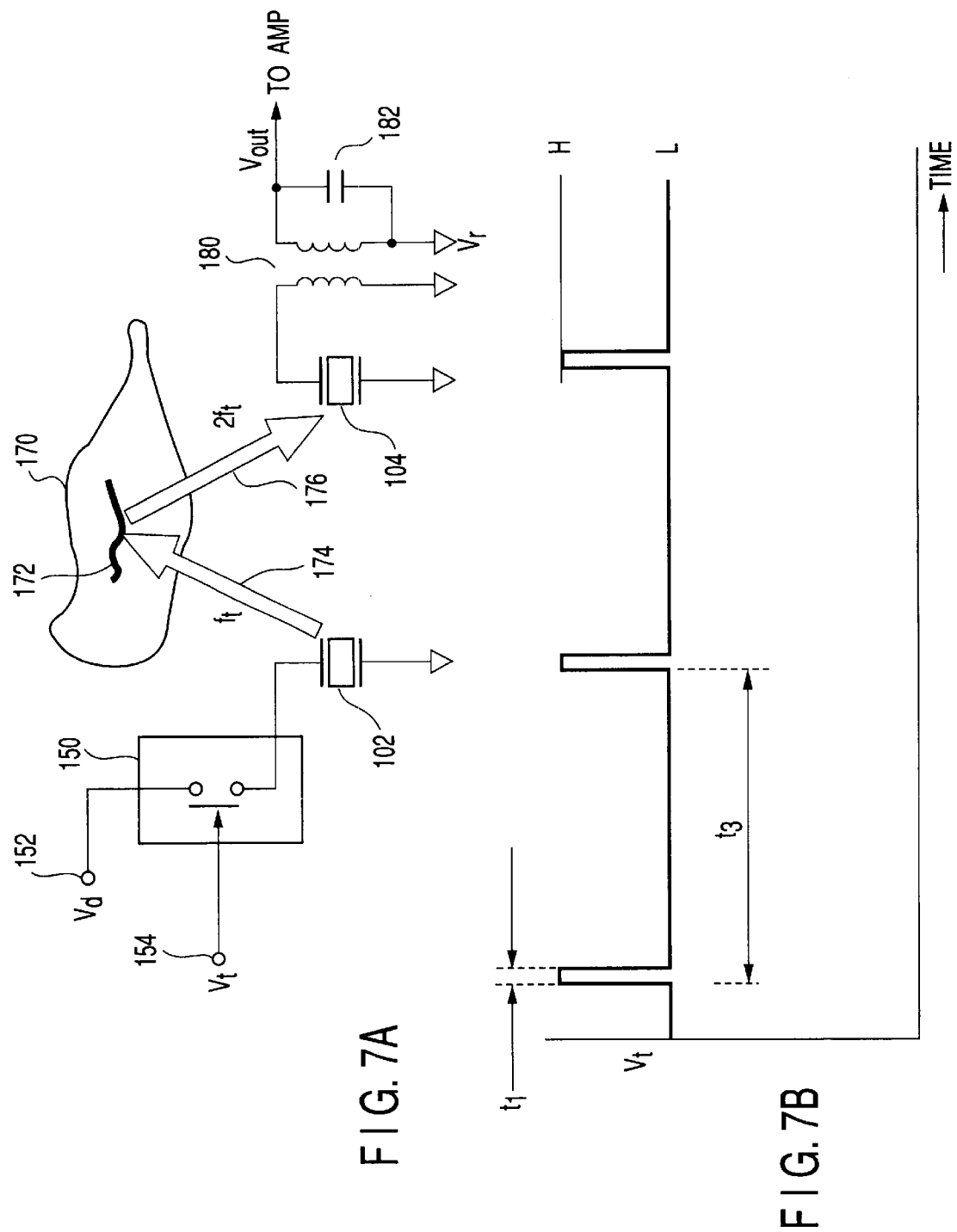
FIG. 7A schematically shows a constitution of a modification of the control system for controlling transmission/reception of the ultrasonic transducer shown in FIG. 1.
FIG. 7B shows a timing chart of the control signals $V_t$ and $V_r$ inputted to the on/off control device shown in FIG. 7A.

FIG. 7A schematically shows a constitution of a modification of the control system, and FIG. 7B shows a timing chart of the control signal Vt.

In the control system, a controller of the receiving piezoelectric resonator 104 does not include the selector 160, and instead includes a transformer 180 connected in parallel, and a capacitor 182 connected on a secondary side of a transformer 180. Another constitution is the same as that of the control system shown in FIG. 6A.

For the transformer 180, the inductance on the primary side is small, and during transmission, impedance $\omega L$ (L is a primary-side inductance of the transformer 180) for the frequency $f_0$ is set to an inductance value by which the short state is substantially recognized. Moreover, the capacitor 182 has a capacitance tuned to the frequency $nf_0$ (n is an integer of 2 or more).

In the control system, among the received signals from the receiving piezoelectric resonator 104, a pressure of only a component of $nf_0$ (n is an integer of 2 or more), that is, the harmonic signal is selectively raised by a secondary-side tuning circuit (transformer 180 and capacitor 182), and an output $V_{out}$ is sent to the subsequent signal processor such as the amplifier.

In the present embodiment, the ultrasonic transducer has separate transmitting and receiving piezoelectric resonators which are superposed and disposed in layers. The control system controls and holds the state between the electrodes of the receiving piezoelectric resonator in the short state or the nearly short state during ultrasonic transmission for a specific time, and holds the state between the electrodes of the transmitting piezoelectric resonator in the open state or the nearly open state during ultrasonic reception for the specific time. Thereby, since the noise component by the residual vibration is eliminated, the opening structure is the same, and the ultrasound is transmitted/received in the whole opening area, reception of the harmonic signal with a large output is possible.

Additionally, the constitution of the mechanical sector scanning integral ultrasonic transducer has been described above as the present embodiment, but the technique described in the present embodiment can also be applied to an electronic scanning array ultrasonic transducer, and is not limited to the mechanical sector scanning integral ultrasonic transducer. Moreover, it is possible to variously combine the basic forms and modification structures in the present embodiment. Various constitutions of the harmonic imaging ultrasonic transducer are possible in accordance with a diagnosis object portion and diagnosis precision, and these constitutions are also included as other modification examples of the present embodiment.

[Second Embodiment]

According to a second embodiment, there is provided an ultrasonic transducer suitable for harmonic imaging ultrasonic diagnosis.

Figure 9A:
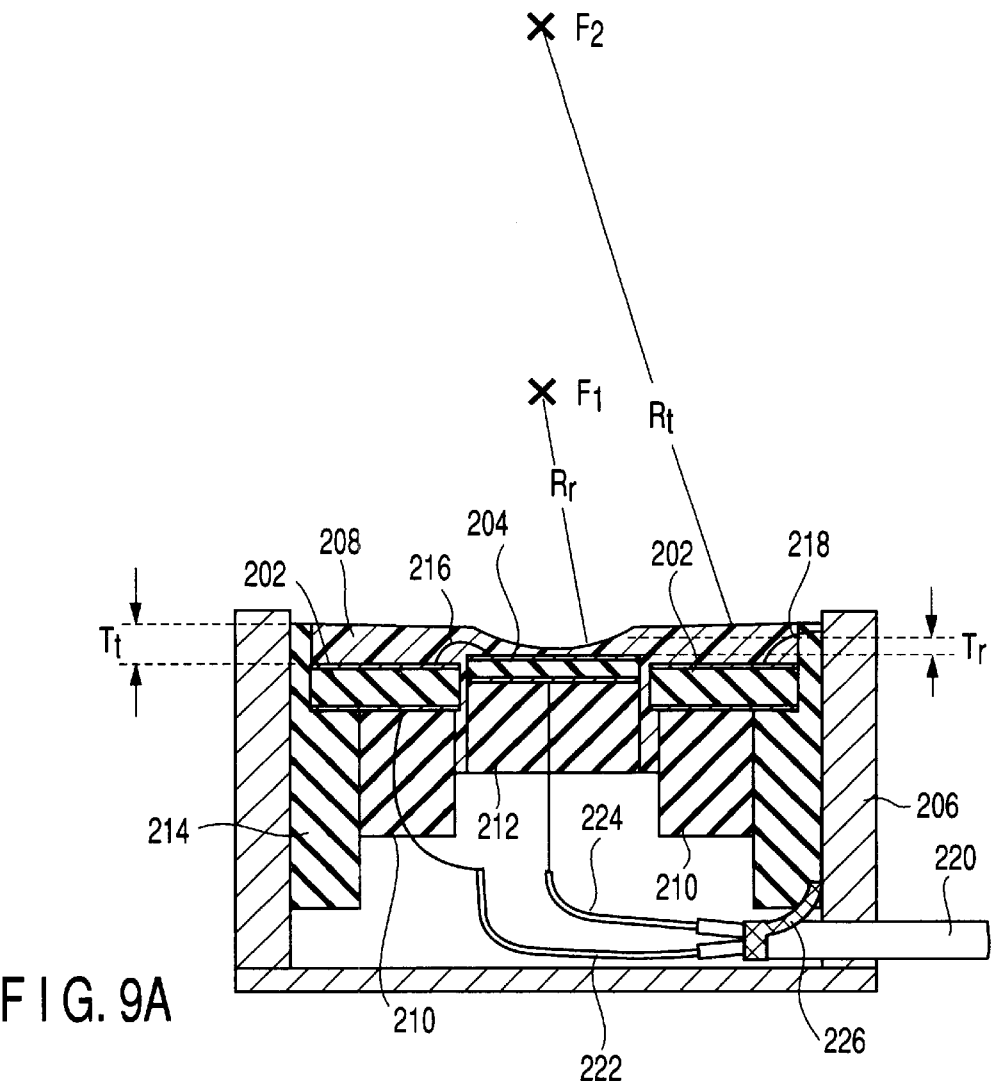
FIG. 9A shows a side section of the ultrasonic transducer of a second embodiment.
Figure 9B:
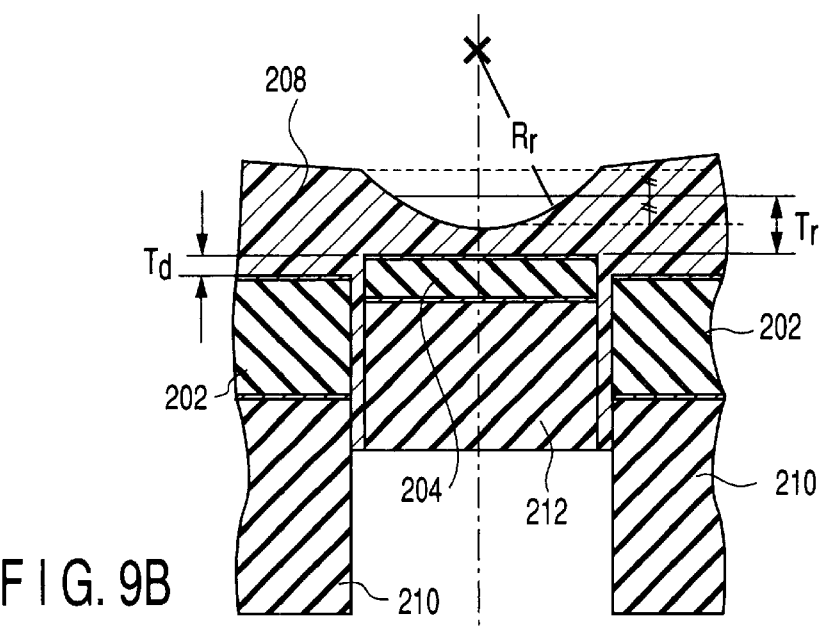
FIG. 9B shows an enlarged middle portion of the acoustic lens shown in FIG. 9A.

As shown in FIG. 9A and FIG. 9B, the ultrasonic transducer includes a transmitting piezoelectric resonator 202, receiving piezoelectric resonator 204, housing 206 for containing these piezoelectric resonators 202, 204, and acoustic lens 208.

The transmitting piezoelectric resonator 202 has an annular band shape, the receiving piezoelectric resonator 204 has a disc shape, and the receiving piezoelectric resonator 204 is positioned inside the transmitting piezoelectric resonator 202.

The transmitting piezoelectric resonator 202 has a piezoelectric material such as polarized lead zirconium titanate (PZT) ceramic, and a pair of electrodes disposed opposite each other via the piezoelectric material. The receiving piezoelectric resonator 204 has a piezoelectric material such as a composite piezoelectric material formed of PZT having a composition other than that of the transmitting piezoelectric resonator 202, lead titanate ($PbTiO_3$) ceramic, single-crystal piezoelectric material ($K(Ta_xNb_{1-x})O_3$), or PZT and a resin, and a pair of electrodes disposed opposite each other via the piezoelectric material. The receiving piezoelectric resonator 204 has a voltage output coefficient $g_{33}$ larger than that of the transmitting piezoelectric resonator 202.

A damping layer 210 is disposed on a back surface of the transmitting piezoelectric resonator 202, and a damping layer 212 is disposed on a back surface of the receiving piezoelectric resonator 204. Since the frequency of the received ultrasound is an integral multiple of the frequency of the transmitted ultrasound, a damping degree of the damping layer 212 of the back surface of the receiving piezoelectric resonator 204 is set to be weaker than the damping degree of the damping layer 210 of the back surface of the transmitting piezoelectric resonator 202.

Therefore, the damping layer 212 may be formed of a material with a relatively small ultrasonic attenuation ratio. This is because the damping layer 212 includes an insulating damping layer with alumina dispersed in an epoxy resin, and an influence of electric cross talk is effectively avoided via the damping layer.

The acoustic lens 208, for example, of an epoxy resin is disposed in front of the piezoelectric resonators 202, 204. The acoustic lens 208 is imaginarily divided into a peripheral portion positioned in front of the transmitting piezoelectric resonator 202 and a middle portion positioned in front of the receiving piezoelectric resonator 204. The peripheral portions of the transmitting piezoelectric resonator 202, damping layer 210 and acoustic lens 208 constitute a transmitting ultrasonic vibrator, and the middle portions of the receiving piezoelectric resonator 204, damping layer 212 and acoustic lens 208 constitute a receiving ultrasonic vibrator. That is, both the transmitting and receiving ultrasonic vibrators partially include the acoustic lens 208.

The peripheral and middle portions of the acoustic lens 208 have a concave opening surface. The opening surface of the peripheral portion of the acoustic lens 208 has a curvature radius Rt, and the opening surface of the middle portion of the acoustic lens 208 has a curvature radius $R_r$ smaller than the curvature radius $R_t$. That is, the acoustic lens 208 has an opening surface having the curvature radius which partially differs.

The curvature radius $R_t$ of the opening surface of the peripheral portion of the acoustic lens 208 has a value equal to an acoustic focal length $F_2$ for the ultrasound having the center frequency $f_0$. Moreover, the curvature radius $R_r$ of the opening surface of the middle portion of the acoustic lens 208 has a value equal to an acoustic focal length $F_1$ for the ultrasound having the center frequency $nf_0$ (n is an integer of 2 or more). For the curvature radius $R_t$ of the opening surface of the peripheral portion of the acoustic lens 208 and the curvature radius $R_r$ of the opening surface of the middle portion of the acoustic lens 208, values are preferably selected such that respective focuses agree with each other.

Furthermore, the acoustic lens 208 preferably has an acoustic matching function. That is, the peripheral portion of the acoustic lens 208 has a thickness which is ¼ of a wavelength corresponding to the ultrasound with the center frequency $f_0$ on average, and the middle portion of the acoustic lens 208 has a thickness which is ¼ of a wavelength corresponding to the ultrasound with the center frequency $nf_0$ on average. For example, for the harmonic signal with the frequency $2f_0$, an average thickness $T_r$ of the middle portion of the acoustic lens 208 is preferably ½ of an average thickness $T_t$ of the peripheral portion of the acoustic lens 208. Here, the average thickness $T_r$ is a distance from the surface of the receiving piezoelectric resonator 204 to a middle between a bottom of the concave surface of the curvature radius $R_r$ and an upper end of the concave surface of the curvature radius $R_r$. Moreover, the average thickness $T_t$ is a distance from the surface of the transmitting piezoelectric resonator 202 to a middle between an imaginary bottom of the curvature radius $R_t$ and the upper end (i.e., a lens effective end with respect to the transmitting piezoelectric resonator) of the concave surface of the curvature radius $R_t$.

When this condition and the agreement of the focuses are both satisfied, a difference in thickness sometimes occurs in a boundary of two lens portions different in curvature radius from each other. In order to avoid differences in thickness, as shown in FIG. 9B, the surface position of the receiving piezoelectric resonator 204 projects upward from the surface position of the transmitting piezoelectric resonator 202 by a length $T_d$.

The structure including the transmitting piezoelectric resonator 202, receiving piezoelectric resonator 204 and acoustic lens 208 is fixed inside the housing 206 via an insulating layer 214. A front electrode of the receiving piezoelectric resonator 204 is connected to a front electrode of the transmitting piezoelectric resonator 202 via a wiring 216, and a front electrode of the transmitting piezoelectric resonator 202 is connected to the housing 206 via a wiring 218. A two-core coaxial cable 220 has a lead wire 222 connected to a back electrode of the transmitting piezoelectric resonator 202, a lead wire 224 connected to a back electrode of the receiving piezoelectric resonator 204, and a shielding wire 226 connected to the housing 206.

The ultrasound with the center frequency $f_0$ transmitted from the transmitting piezoelectric resonator 202 is converged by the acoustic lens 208, and focused in a position $F_2$. The echo signal propagated through the living tissue having a large nonlinear effect, and including the harmonic signal is incident upon the receiving piezoelectric resonator 204 having a resonant frequency $nf_0$ (n is an integer of 2 or more) via the acoustic lens 208, and is converted to the electric signal.

With the receiving piezoelectric resonator 204 of a material having the same sound velocity as that of the transmitting piezoelectric resonator, the thickness of the receiving piezoelectric resonator 204 is set to be substantially 1/n of the thickness of the transmitting piezoelectric resonator 202. Thereby, the receiving piezoelectric resonator 204 selectively receives a frequency component of $nf_0$ (n is an integer of 2 or more).

Moreover, since the curvature radii $R_t$ and $R_r$ are determined in order to allow the focus for the transmitted frequency with the center frequency $f_0$ to agree with the focus for the received frequency with the center frequency $nf_0$ (n is an integer of 2 or more), the acoustic lens can also obtain a satisfactory spatial resolution. Furthermore, since the average thickness of the acoustic lens is set to ¼λ for each frequency, broad-band and high-sensitivity transmission/reception can be performed.

In the second embodiment, since the transmitting piezoelectric resonator 202 and receiving piezoelectric resonator 204 are separately disposed substantially in the same plane, the ultrasound generated by the transmitting piezoelectric resonator 202 is not transmitted through the receiving piezoelectric resonator 204 or is not reflected by the receiving piezoelectric resonator 204. Therefore, it is unnecessary to control the state between the electrodes in the open or short state, and control is remarkably simple.

In the second embodiment, when a piezoelectric g constant of the receiving piezoelectric resonator 204 is set to be larger than the piezoelectric g constant of the transmitting piezoelectric resonator 202, and the piezoelectric material having a large mechanical quality factor Qm is used, the selection property of harmonic signal reception is further enhanced.

Modification examples of the second embodiment will be described hereinafter with reference to the drawings. In the drawings, members equivalent to the aforementioned members are denoted with the same reference numerals, and a detailed description thereof is omitted to avoid redundancy in the following description.

Figure 10:
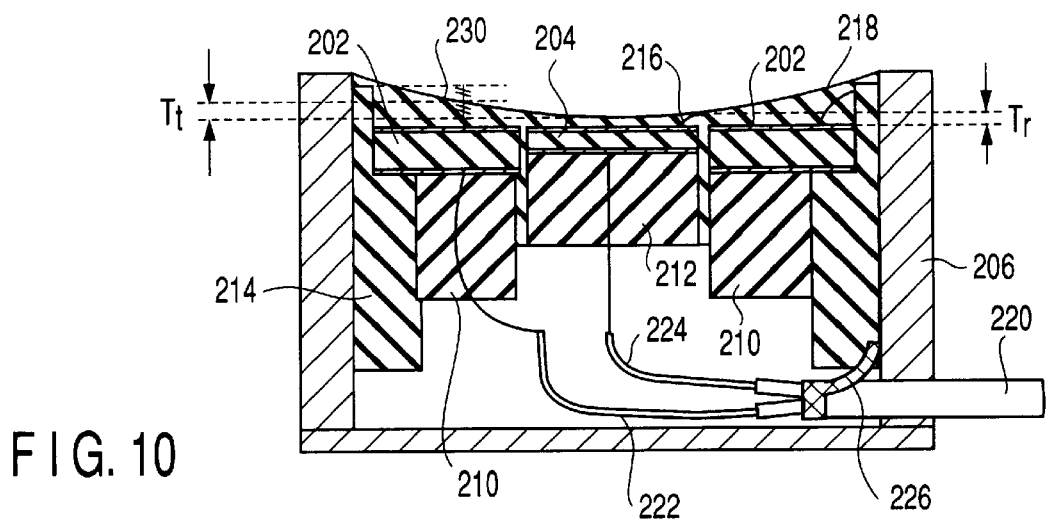
FIG. 10 shows a side section of a first modification of the ultrasonic transducer of the second embodiment.

FIG. 10 shows a first modification of the ultrasonic transducer. In the ultrasonic transducer of the present modification example, an acoustic lens 230 has an opening surface with a constant curvature radius. The acoustic lens 230 is imaginarily divided into a peripheral portion positioned in front of the transmitting piezoelectric resonator 202, and a middle portion positioned in front of the receiving piezoelectric resonator 204. The peripheral portions of the transmitting piezoelectric resonator 202, damping layer 210 and acoustic lens 230 constitute a transmitting ultrasonic vibrator, and the middle portions of the receiving piezoelectric resonator 204, damping layer 212 and acoustic lens 230 constitute a receiving ultrasonic vibrator.

The peripheral portion of the acoustic lens 230 has an average thickness $T_t$ equal to ¼ of the wavelength of the ultrasound with the fundamental frequency $f_0$, and the middle portion of the acoustic lens 230 has an average thickness $T_r$ which is ¼ of the wavelength of the ultrasound with the fundamental frequency $nf_0$ (n is an integer of 2 or more) Here, the average thickness $T_t$ is a distance from the surface of the transmitting piezoelectric resonator 202 to the middle between a bottom and an upper end (i.e., the lens effective end with respect to the transmitting piezoelectric resonator 202) of the acoustic lens 230. The average thickness $T_r$ is a distance from the surface of the receiving piezoelectric resonator 204 to the middle between a bottom and an upper end (i.e., the lens effective end with respect to the receiving piezoelectric resonator 204) of the concave surface of the acoustic lens 230.

The opening surface of the acoustic lens 230 has a curvature radius equal to a radius of a spherical surface which circumscribes a circle obtained by connecting a point of the average thickness $T_t$ of the peripheral portion of the acoustic lens 230, and a circle obtained by connecting a point of the average thickness $T_r$ of the middle portion of the acoustic lens 230.

Thereby, the spatial resolution is slightly deteriorated, but acoustic matching conditions are approximately satisfied, and a high-sensitivity reception is performed with respect to the harmonic signal. Moreover, since the curvature radius of the acoustic lens 230 is the same over the whole opening, processing is facilitated. Therefore, an inexpensive ultrasonic transducer can be presented for harmonic imaging ultrasonic diagnosis.

Figure 11:
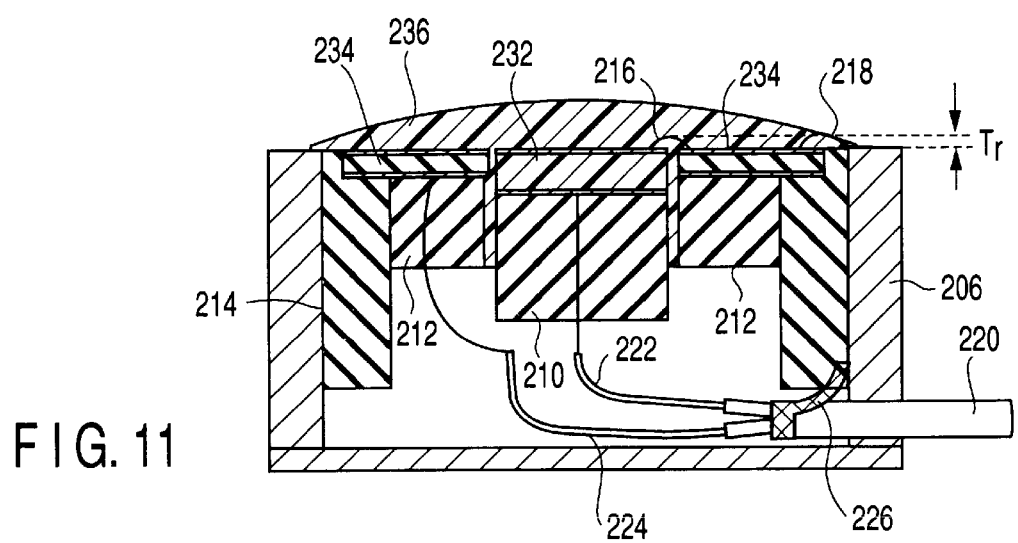
FIG. 11 shows a side section of a second modification of the ultrasonic transducer of the second embodiment.

FIG. 11 shows a second modification of the ultrasonic transducer. The ultrasonic transducer of the present modification has a disc-shaped transmitting piezoelectric resonator 232, and an annular band shaped receiving piezoelectric resonator 234, and the transmitting piezoelectric resonator 232 is positioned inside the receiving piezoelectric resonator 234.

An acoustic lens 236 is imaginarily divided into a middle portion positioned in front of the transmitting piezoelectric resonator 232, and a peripheral portion positioned in front of the receiving piezoelectric resonator 234. The middle portions of the transmitting piezoelectric resonator 232, damping layer 212 and acoustic lens 236 constitute a transmitting ultrasonic vibrator. The peripheral portions of the receiving piezoelectric resonator 234, damping layer 212 and acoustic lens 236 constitute a receiving ultrasonic vibrator.

Both the middle portion and the peripheral portion of the acoustic lens 236 have a convex opening surface. The opening surface of the middle portion of the acoustic lens 236 has a curvature radius $R_t$, and the opening surface of the peripheral portion of the acoustic lens 236 has a curvature radius $R_r$ larger than the curvature radius $R_t$.

An original object of the acoustic lens 236 is to converge the ultrasound, but the acoustic lens is further preferably provided with a function of an acoustic matching layer. The acoustic matching layer for the harmonic signal is thinner than the acoustic matching layer for the fundamental frequency. For the acoustic lens 236, a lens portion in the vicinity of a center is thick, and a peripheral lens portion is thin. Therefore, the transmitting piezoelectric resonator 232 is disposed inside the receiving piezoelectric resonator 234.

Figure 12:
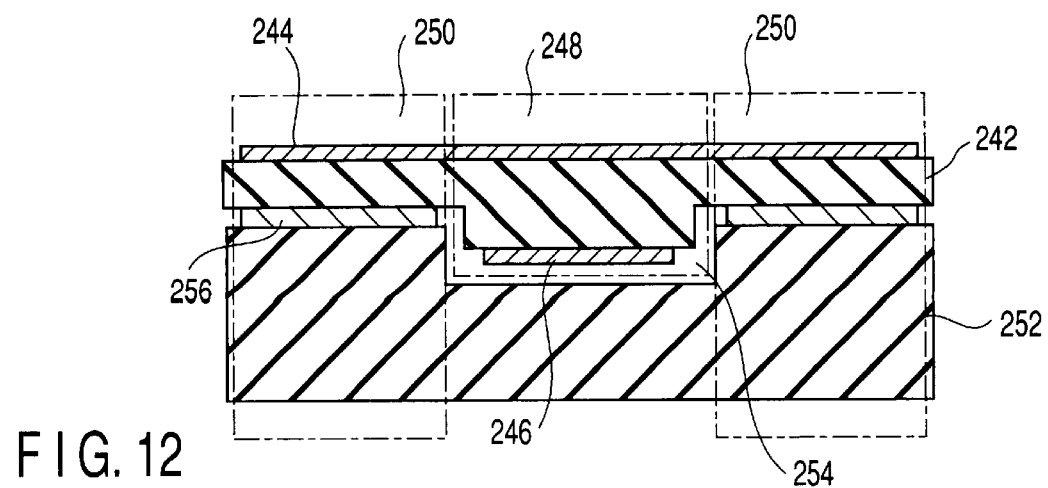
FIG. 12 shows a side section of a third modification of the ultrasonic transducer of the second embodiment.

FIG. 12 shows a main part of a third modification of the ultrasonic transducer. The main part of the ultrasonic transducer of the present modification is a part contained in the housing. The part includes a circular transmitter 248 or a transmitting ultrasonic vibrator, and an annular band shaped receiver 250 or a receiving ultrasonic vibrator which surrounds the transmitter. The transmitter 248 includes a middle portion of the piezoelectric resonator 242, and the receiver 250 includes the peripheral portion of the piezoelectric resonator 242, and a damping layer 252 disposed on the back surface of the vibrator.

The piezoelectric resonator 242 is disc-shaped, and has an electrode 244 common to the transmitter 248 and receiver 250 on a front surface thereof, and a circular electrode 246 of the transmitter 248 and an annular band shaped electrode 256 of the receiver 250 on a back surface thereof. The receiver 250 of the piezoelectric resonator 242 has a thickness which is 1/n of the thickness of the transmitter 248, and can selectively receive an n-dimensional high order harmonic wave having a frequency component of $nf_0$ (n is an integer of 2 or more) with respect to a fundamental ultrasound $f_0$ transmitted from the transmitter 248.

The damping layer 252 has a concave depression in a middle portion corresponding to the transmitter 248 of the piezoelectric resonator 242, and an annular band portion outside the depression is bonded to the receiver 250 of the piezoelectric resonator 242. A bottom of the concave depression does not contact the transmitter 248 of the piezoelectric resonator 242, and a gap 254 is formed in the back surface of the transmitter 248.

In the structure, the transmitter 248 has a large mechanical quality factor Qm, and can radiate a broad-band transmission ultrasound with a large amplitude. In the present modification example, the damping layer 252 has the concave depression in the middle portion corresponding to the transmitter 248, but may have a through hole.

Figure 13A:
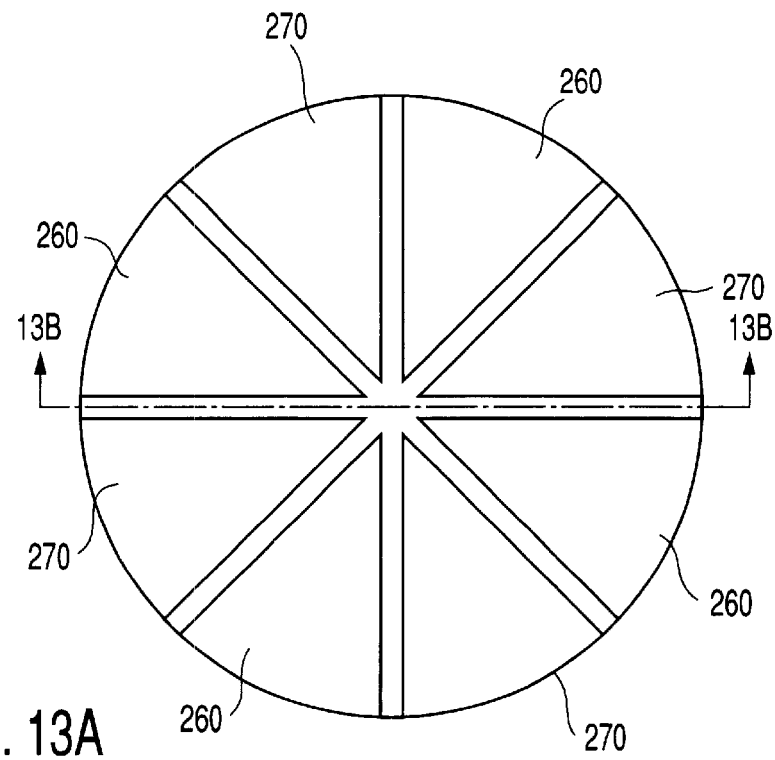
FIG. 13A shows an upper surface of a fourth modification of the ultrasonic transducer of the second embodiment.
Figure 13B:
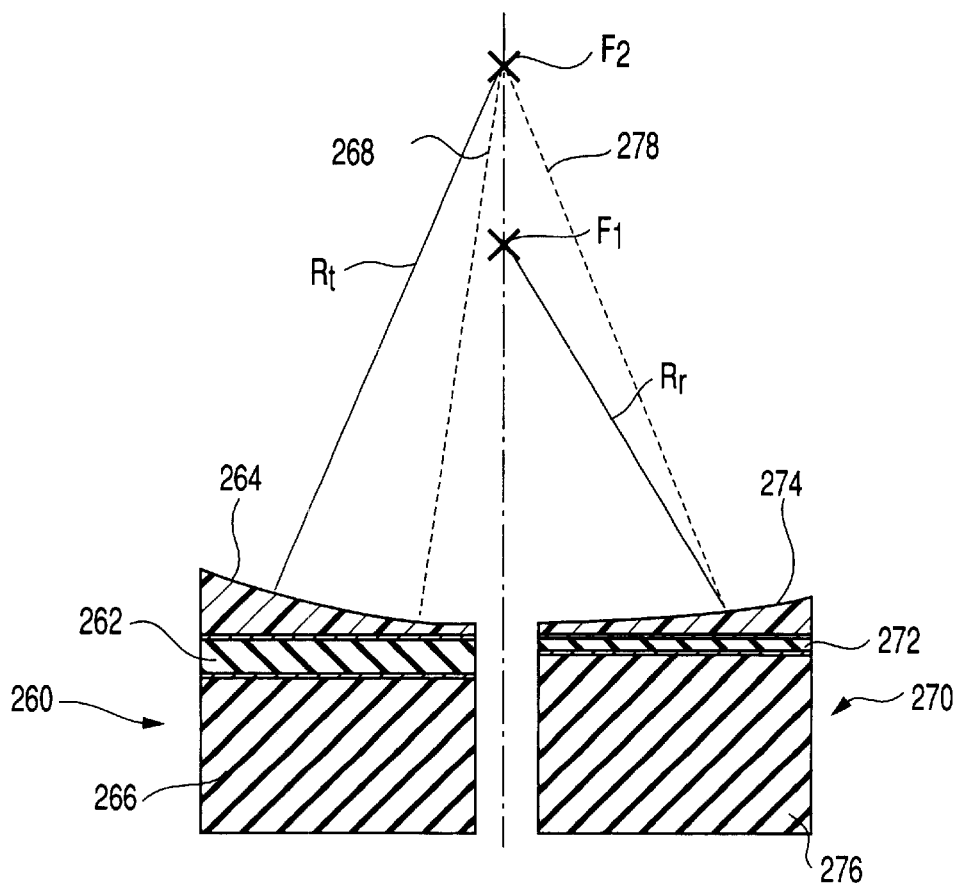
FIG. 13B shows a side section of the ultrasonic transducer taken along line 13B—13B of FIG. 13A.

FIG. 13A and FIG. 13B show a main part of a fourth modification of the ultrasonic transducer. The main part of the ultrasonic transducer of the present modification is contained in the housing, and has four transmitting ultrasonic vibrators 260 and four receiving ultrasonic vibrators 270. Both the transmitting ultrasonic vibrator 260 and the receiving ultrasonic vibrator 270 have the same fan shape, and these vibrators are alternately disposed in a radiant shape. That is, the fan-shaped transmitting ultrasonic vibrators 260 and receiving ultrasonic vibrators 270 are alternately arranged along an angular direction.

The transmitting ultrasonic vibrator 260 has a transmitting piezoelectric resonator 262 for transmitting a fundamental ultrasound with a frequency $f_0$, a transmitting acoustic lens 264 disposed on a front surface of the vibrator, and a damping layer 266 disposed on a back surface of the transmitting piezoelectric resonator 262. The transmitting acoustic lens 264 has a surface curvature radius $R_t$ centering on a point $F_2$, and is focused at the point $F_2$ along an acoustic line 268 for the ultrasound with the fundamental frequency f0 transmitted from the transmitting piezoelectric resonator 262.

The receiving ultrasonic vibrator 270 has a receiving piezoelectric resonator 272 for selectively receiving a harmonic ultrasound with a frequency $nf_0$ (n is an integer of 2 or more), a receiving acoustic lens 274 disposed on a front surface of the vibrator, and a damping layer 276 disposed on a back surface of the receiving piezoelectric resonator 272. The receiving acoustic lens 274 has a surface curvature radius $R_r$ centering on a point $F_1$, and is focused at the point $F_2$ along an acoustic line 278 for the harmonic ultrasound with the frequency $nf_0$.

In the structure, opening areas of the transmitting ultrasonic vibrator 260 and receiving ultrasonic vibrator 270 are the same for transmission/reception, and focuses can be matched only by a lens surface shape.

In the ultrasonic transducer of the second embodiment, the transmitting and receiving ultrasonic vibrators are separated from each other in the plane. Therefore, when the shape of the acoustic lens disposed on the front surface of the piezoelectric resonator is optimized, transmission/reception is efficiently performed. Additionally, while the focuses of the fundamental ultrasound and harmonic ultrasound agree with each other, the spatial resolution is satisfactory, and reception of the harmonic signal with a large output is possible.

The constitution of the mechanical sector scanning integral ultrasonic transducer has been described above as the second embodiment, but the content described in the second embodiment can also be applied to the electronic scanning array ultrasonic transducer, except the fourth modification example, and is not limited to application to the mechanical sector scanning integral ultrasonic transducer. Moreover, it is possible to variously combine the present embodiment modes and modification constitutions. Various constitutions of the harmonic imaging ultrasonic transducer are possible in accordance with the diagnosis object portion and diagnosis precision, and these constitutions are also included as other modification examples of the present embodiment.

[Third Embodiment]

Figure 14:
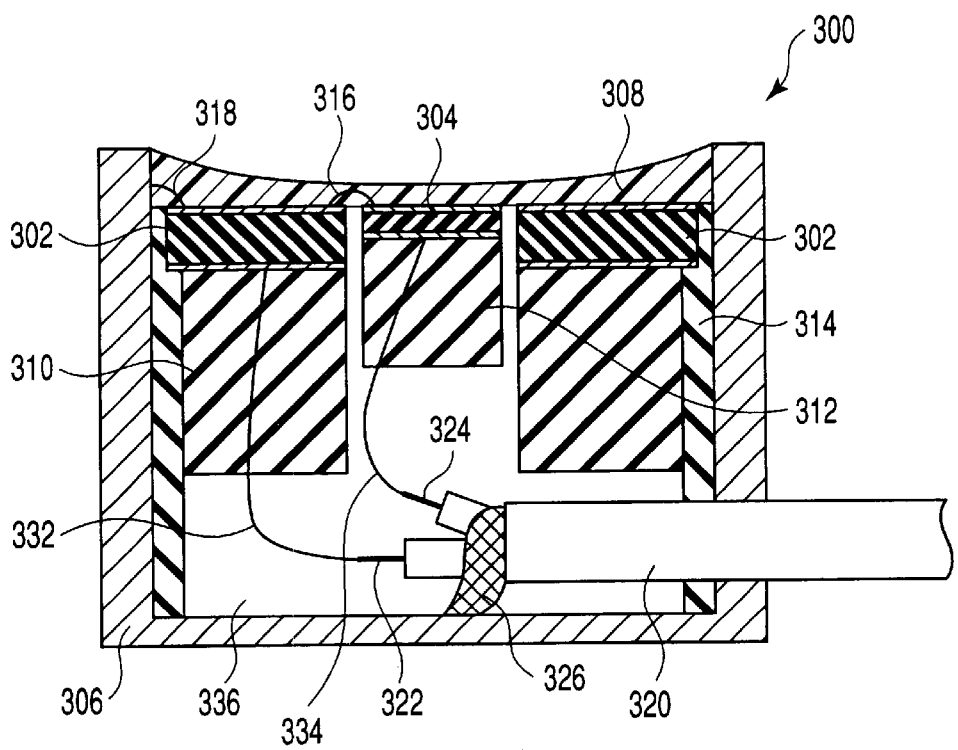
FIG. 14 is a sectional view of an in-plane separated ultrasonic transducer of a third embodiment.

As shown in FIG. 14, an ultrasonic transducer 300 has a transmitting ultrasonic vibrator for transmitting the fundamental ultrasound, a receiving ultrasonic vibrator for receiving the harmonic signal, and a housing 306 in which these vibrators are contained. The transmitting ultrasonic vibrator has a transmitting piezoelectric resonator 302, and a backing layer (dumping layer) 310 disposed on the back surface of vibrator. Moreover, the receiving ultrasonic vibrator has a receiving piezoelectric resonator 304, and a backing layer (dumping layer) 312 disposed on the back surface of the vibrator.

The transmitting piezoelectric resonator 302 has an annular band plate shape, the receiving piezoelectric resonator 304 has a disc shape, and the receiving piezoelectric resonator 304 is positioned inside the transmitting piezoelectric resonator 302. A concave acoustic lens 308, for example, of an epoxy resin or the like is disposed on the front surface of the transmitting piezoelectric resonator 302 and receiving piezoelectric resonator 304.

Furthermore, the transmitting and receiving ultrasonic vibrators partially have the acoustic lens 308. That is, the receiving ultrasonic vibrator has a part, that is, a circular middle portion of the acoustic lens 308 positioned on the front surface of the receiving piezoelectric resonator 304. The transmitting ultrasonic vibrator has a part, that is, an annular band shaped peripheral portion of the acoustic lens 308 positioned on the front surface of the transmitting piezoelectric resonator 302.

The transmitting ultrasonic vibrator transmits a fundamental ultrasound having the center frequency $f_0$ in response to input of the electric signal, and the receiving ultrasonic vibrator receives the harmonic signal having the center frequency $nf_0$ (n is an integer of 2 or more) generated in an object by the fundamental ultrasound.

The transmitting and receiving ultrasonic vibrators, that is, the structure including the transmitting piezoelectric resonator 302, receiving piezoelectric resonator 304, acoustic lens 308 and backing layers 310 and 312 is fixed inside the housing 306 via an insulating layer 314.

The receiving piezoelectric resonator 304 has a disc shaped piezoelectric material, and a pair of electrodes formed entirely on opposite surfaces of the piezoelectric material. Similarly, the transmitting piezoelectric resonator 302 has an annular plate shaped piezoelectric material, and a pair of electrodes formed entirely on opposite surfaces of the piezoelectric material. The electrode on the front side, that is, the ultrasonic emission surface side of the receiving piezoelectric resonator 304 is electrically connected to the electrode on the front side, that is, the ultrasonic emission surface side of the transmitting piezoelectric resonator 302 via a wiring 316. The front electrode of the transmitting piezoelectric resonator 302 is electrically connected to the housing 306 via a wiring 318.

A two-core coaxial cable 320 extending through the housing 306 has a lead wire 322, lead wire 324 and shielding wire 326. The lead wire 322 is electrically connected to a back electrode of the transmitting piezoelectric resonator 302 via a wiring 332, the lead wire 324 is electrically connected to a back electrode of the receiving piezoelectric resonator 304 via a wiring 334, and the shielding wire 326 is electrically connected to the conductive housing 306. Furthermore, an internal space 336 of the housing 306 is filled with a seal material such as an epoxy resin.

Figure 15A:
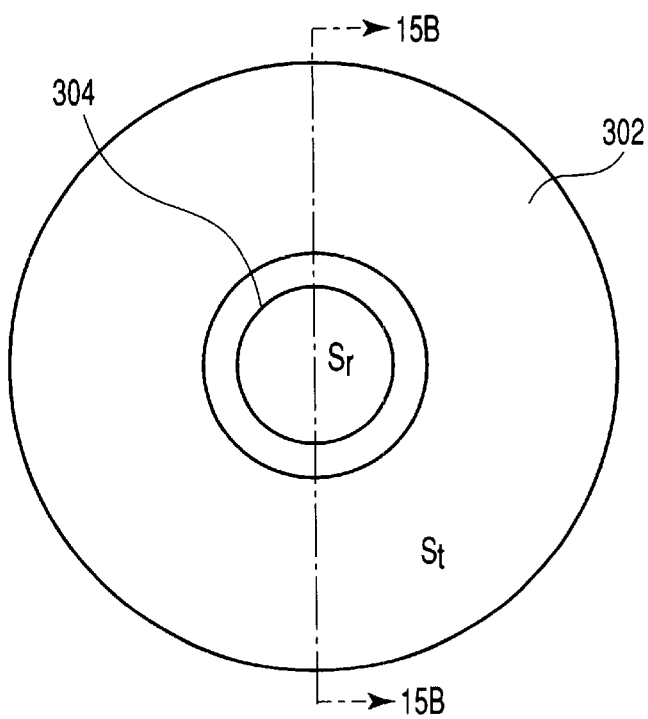
FIG. 15A is a front view showing models of the transmitting piezoelectric resonator and receiving piezoelectric resonator shown in FIG. 14.
Figure 15B:
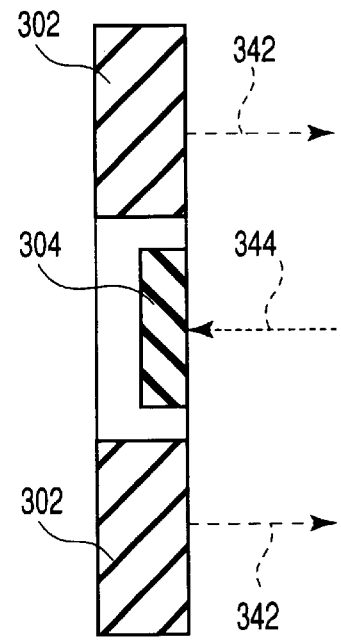
FIG. 15B is a sectional view taken along line 15B—15B of FIG. 15A.

FIG. 15A and FIG. 15B show models of the transmitting and receiving piezoelectric resonators of the in-plane separated ultrasonic transducer shown in FIG. 14. As shown in FIG. 15A, the transmitting piezoelectric resonator 302 has an annular band shape, the receiving piezoelectric resonator 304 has a disc shape, and the receiving piezoelectric resonator 304 is positioned inside the transmitting piezoelectric resonator 302. In FIG. 15B, not only a second order or third order harmonic signal 344, but also ultrasounds of all frequency components contained in transmitted ultrasounds 342 and superimposed onto the harmonic signal reach the disc shaped receiving piezoelectric resonator 304.

As seen from FIG. 15A, in the in-plane separated ultrasonic transducer, an opening area of the transmitting piezoelectric resonator decreases as compared with the in-plane transmission/reception integral ultrasonic transducer for transmission/reception by the whole opening surface. Moreover, as shown in FIG. 15B, the thickness of the receiving piezoelectric resonator decreases with an increase of a degree of the received harmonic signal.

Sensitivity deterioration with the decrease of the opening area of the transmitting piezoelectric resonator and the decrease of the thickness of the receiving piezoelectric resonator will be considered hereinafter. It is then proved that a satisfactory sensitivity can be obtained by appropriately selecting the piezoelectric materials of the transmitting piezoelectric resonator 302 and receiving piezoelectric resonator 304.

Assuming that an opening area of the transmitting piezoelectric resonator 302 is $S_t$, and opening area of the receiving piezoelectric resonator 304 is $S_r$, as compared with the conventional in-plane transmission/reception integral ultrasonic transducer in which the opening area is $S_t+S_r$, a transmission ultrasonic energy drops substantially to $S_t/(S_t+S_r)$.

An output voltage $V_{out}$ of the receiving piezoelectric resonator 304 is represented by the following equation (1).

$$V_{out}=q_r/C_r=d_{33r} \cdot T \cdot S_r/(\epsilon S_r/t_r)=g_{33r} \cdot t_r \cdot T \qquad (1)$$

Here, $q_r$ denotes a charge piezoelectrically converted and generated on the electrode of the receiving piezoelectric resonator 304, $C_r$ denotes a capacitance of the receiving piezoelectric resonator 304, e denotes permittivity of the receiving piezoelectric resonator 304, $d_{33r}$ denotes a piezoelectric constant of the receiving piezoelectric resonator 304, $g_{33r}$ denotes a voltage output coefficient of the receiving piezoelectric resonator, $t_r$ denotes a thickness of the receiving piezoelectric resonator, and T denotes an ultrasonic reception stress.

Furthermore, assuming that the frequency of the received ultrasound is $f_r$, and longitudinal wave sound velocity of the piezoelectric resonator material is $V_r$, the following equation results.

$$t_r = \lambda/2 = V_r/2f_r \quad (2)$$

Therefore, the equation (1) results in the following equation.

$$V_{out} = g_{33r} \cdot t_r \cdot T = g_{33r} \cdot V_r \cdot T/2f_r \quad (3)$$

Furthermore, assuming that the ultrasonic reception stress T is proportional to the opening of the transmitting piezoelectric resonator, the following equation results.

$$V_{out} = g_{33r} \cdot V_r \cdot T/2f_r = g_{33r} \cdot V_r \cdot S_r \cdot P_0/2f_r$$
$$= g_{33r} \cdot V_r \cdot S_t \cdot d_{33t} \cdot V_{drive}/2f_r \quad (4)$$

Moreover, when the received ultrasound is an n-dimensional harmonic signal, the following equation results.

$$V_{out} = g_{33r} \cdot V_r \cdot S_t \cdot d_{33t} \cdot V_{drive}/2nf_r \quad (5)$$

Here, $S_t$ denotes an opening of the transmitting piezoelectric resonator, $P_0$ denotes an ultrasonic sound pressure per unit area generated by the transmitting piezoelectric resonator, $d_{33t}$ denotes a piezoelectric constant of the transmitting piezoelectric resonator, and $V_{drive}$ denotes a drive voltage applied to the transmitting piezoelectric resonator.

From the equations (4) and (5), when the n-dimensional harmonic signal is received in the in-plane separated ultrasonic transducer, the received frequency increases n times, and the output voltage $V_{out}$ drops to 1/n.

Moreover, as compared with the in-plane transmission/reception integral ultrasonic transducer, a transmission opening area is $S_t/(S_t+S_r)$ times that of the in-plane transmission/reception integral ultrasonic transducer, and the output voltage $V_{out}$ accordingly drops further.

Usually, the piezoelectric resonator of the same piezoelectric material is used in the transmitting and receiving piezoelectric resonators. Based on this assumption, for example, when $S_t = S_r$, the frequency $f_r$ of a detected ultrasound is $2f_0$, and the output voltage $V_{out}$ drops to ¼ (=−12 dB).

Here, the in-plane separated ultrasonic transducer shown in FIG. 15A and FIG. 15B is used as a comparison object, and the in-plane separated ultrasonic transducer for detecting only the fundamental ultrasound as shown in FIG. 16A and FIG. 16B is considered. This ultrasonic transducer corresponds to a usual pulse echoing transducer of a whole surface integral type.

In the ultrasonic transducer, a transmitting piezoelectric resonator 352 and receiving piezoelectric resonator 354 have the same thickness and use the same piezoelectric material. For example, the piezoelectric resonator of a PZT based piezoelectric material having a longitudinal wave sound velocity $V_r = 4260$ [m/s], and a voltage output coefficient $g_{33r} = 30 \times 10^{-3}$ [Vm/N] is disposed.

For the ultrasonic transducer of FIG. 16A and FIG. 16B, since the receiving piezoelectric resonator 354 is also used in transmission, the same transmission/reception as that for the fundamental pulse echo diagnosis by the conventional integral ultrasonic transducer is performed, and the transmission opening area of the ultrasonic transducer of FIG. 16A and FIG. 16B is substantially $S_t + S_r$.

The reception voltage $V_{r1}$ in the fundamental wave reception is represented by replacing suffix r in the equation (4) with suffix t for convenience as follows.

$$V_{r1} = g_{33t} \cdot V_t \cdot (S_t + S_r) \cdot Q_t \cdot d_t \cdot V_{drive}/2f_t \quad (6)$$

Here, $Q_t$ denotes a resonance sharpness of general mechanical vibration of the ultrasonic vibrator including the backing layer and acoustic matching layer.

On the other hand, when the reception voltage in the n-dimensional harmonic reception is $V_{rn}$, similar to the equation (6), the following equation results.

$$V_{rn} = g_{33r} \cdot V_r \cdot S_t \cdot Q_r \cdot d_t \cdot V_{drive}/2nf_t \quad (7)$$

For the ultrasonic transducer of FIG. 15A and FIG. 15B, to compensate for the sensitivity deterioration, the n-dimensional harmonic signal can preferably be received with a signal level which is not less than the fundamental wave reception voltage in the ultrasonic transducer of FIG. 16A and FIG. 16B. For this, the ultrasonic transducer of FIG. 15A and FIG. 15B may satisfy $V_{rn}/V_{r1} \geq 1$.

When the equations (6) and (7) are assigned to this relation, the following equation results.

$$V_{rn}/V_{r1} = (g_{33r} \cdot V_r \cdot (S_t+S_r) \cdot Q_r/n)/(g_{33t} \cdot V_t \cdot S_t \cdot Q_t) \geq 1 \quad (8)$$

Finally, the following equation results.

$$(g_{33r} \cdot V_r \cdot Q_r)/(g_{33t} \cdot V_t \cdot Q_t) \geq n \cdot (1+R) \quad (9)$$

Here, $R = S_t/S_r$.

When the mechanical resonance sharpness $Q_t$ of the transmitting piezoelectric resonator 302 is 5 or more, trailing of a transmitted ultrasonic pulse lengthens, and a depth-direction resolution is deteriorated. Moreover, when the sharpness is 1 or less, a fundamental ultrasonic band is excessively broadened, a fundamental wave component mixed amount in $2f_0$ increases, and S/N is deteriorated. Therefore, a value of $Q_t$ is preferably between 1 and 5.

Furthermore, when the mechanical resonance sharpness $Q_r$ of the receiving piezoelectric resonator 304 is 5 or more, the trailing of the reception voltage $V_{rn}$ lengthens, and the depth-direction resolution is deteriorated. Additionally, when the sharpness is 1 or less, a band of the reception voltage $V_{rn}$ is excessively broadened, a fundamental wave component ratio increases, and S/N is deteriorated. Therefore, a value of $Q_r$ is preferably between 1 and 5.

The material of the transmitting piezoelectric resonator may have a piezoelectric constant $d_{33}$ and mechanical quality factor Qm which satisfy $d_{33} > 200 \times 10^{-12}$ [m/V], $70 < Qm < 1000$.

When the value of Qm of the piezoelectric resonator is large, a damping effect of the backing layer is relaxed, and thereby the value of $Q_t$ may be adjusted. In order to set the damping effect to be lower than usual and enhance the resonance sharpness, the backing layer 310 may have a high ultrasonic attenuation ratio, and a low acoustic impedance Zd, for example, an acoustic impedance Zd which is ⅓ or less of the acoustic impedance Zp of the transmitting piezoelectric resonator 302. A material preferable for the backing layer 310 contains, for example, a composite resin formed by mixing an appropriate amount of a tungsten powder in a highly flexible epoxy resin. The tungsten powder is preferably mixed to such an extent that the acoustic impedance of the backing layer 310 is about ⅓ of the acoustic impedance of the piezoelectric resonator and the attenuation ratio is of the order of 8 dB/cm/MHz. Here, with the attenuation ratio of 5 dB/cm/MHz or less, Q excessively increases, time axis pulse width lengthens, and distance-direction resolution is deteriorated. The material of the backing layer 310 is not limited to the aforementioned composite material, and a composite material mixed, for example, with an alumina or zirconia powder may be used.

Since the disc-shaped receiving piezoelectric resonator 304 has a narrow band filter characteristic at the center frequency $2f_0$ or $3f_0$, only a $2f_0$ or $3f_0$ component is selectively converted to a voltage signal. With a relative relation between the acoustic impedance Zp of the piezoelectric resonator and the acoustic impedance Zd of the backing layer, a back surface side ultrasonic vibration of the piezoelectric resonator is divided into an ultrasonic vibration amplitude transmitted toward the backing layer and an ultrasonic vibration amplitude reflected toward the piezoelectric resonator. A division ratio is one of measures for determining the mechanical resonance sharpness Q of the transmitting ultrasonic vibrator. When Zd is ⅓ or less of Zp, a reflected ultrasonic component increases, and it is possible to control the mechanical resonance sharpness Q of the transmitting ultrasonic vibrator to an optimum value of 2 to 5.

The piezoelectric material of the receiving piezoelectric resonator 304 may be a material which has a large Qm, large voltage output coefficient $g_{33}$, and high longitudinal wave sound velocity. The voltage output coefficient $g_{33}$ may satisfy $g_{33} > 30 \times 10^{-3}$ [V/Nm]. Examples of the material preferably include a piezoelectric single crystal represented, for example, by a chemical formula $K(Nb_{1-x}Ta_x)O_3$, $0 \leq x \leq 0.2$. Another preferable material is a lead titanate based piezoelectric ceramic material. A further preferable material is a bismuth layer structure ferroelectric material (BLSF) represented by chemical formula $Bi_4Ti_3O_{12}$ or $Ma_{1-x}Mb_xBi_2McO_8$, $0 \leq x \leq 0.2$. Here, Ma and Mb are alkaline earth metal elements such as Sr and Ba, and Mc is a +5 valence metal element such as Ta and Nb.

When the value of Qm of the piezoelectric resonator is large, the damping effect of the backing layer may be relaxed to adjust the value of $Q_r$. In order to set the damping effect to be lower than usual and enhance the resonance sharpness, the backing layer 312 may have a high ultrasonic attenuation ratio, and a low acoustic impedance Zd, for example, an acoustic impedance Zd which is ⅓ or less of the acoustic impedance Zp of the receiving piezoelectric resonator 304. A material preferable for the backing layer 312 contains, for example, a composite resin formed by mixing an appropriate amount of a tungsten oxide powder or a barium ferrite powder in a highly flexible epoxy resin. The material of the backing layer 312 is not limited to the aforementioned composite material, and the composite material mixed, for example, with an alumina or zirconia powder may be used.

For example, the piezoelectric material of the transmitting piezoelectric resonator 302 is a PZT ceramic material, and the piezoelectric material of the receiving piezoelectric resonator 304 is a potassium niobate ($KNbO_3$) piezoelectric single crystal with a longitudinal wave sound velocity $V_t$=5900 [m/s], and voltage output coefficient $g_{33r}=55 \times 10^{-3}$ [Vm/N].

Here, when $Q_t=1$, $Q_r=5$, and these values and material constants are assigned to a left side of the equation (9), then the left side =12.7. When R=1, that is, transmission opening area=reception opening area, n=6 is possible. Therefore, even a six-dimensional harmonic signal can be satisfactorily received. In actuality, when the value of $Q_r$ is too large, the time axis pulse width increases, and the depth-direction resolution is deteriorated. Therefore, the value of $Q_r$ is preferably small. With a decrease to $Q_r=2.5$, the left side of the equation (9) indicates 6.4, and n=3 is possible. Therefore, even a third order harmonic signal can be satisfactorily received.

Moreover, for the transmitting ultrasonic vibrator, assuming that $Q_t=2$, R=1, then n=2 is possible at $Q_r=3.2$. Therefore, even the third order harmonic signal can satisfactorily be received. Furthermore, when R=0.5, that is, the reception opening area $S_r$ is ½ of the transmission opening area, n=2 is possible at $Q_t=2$, $Q_r=2.4$. Therefore, even a second order harmonic signal can satisfactorily be received.

These transducer properties do not need to be manufactured using an undeveloped technique, and can be sufficiently realized by a conventional transducer manufacturing technique.

As seen from the above description, in the harmonic imaging in-plane separated ultrasonic transducer, when the transmitting and receiving piezoelectric resonators satisfying the equation (9) are used, the harmonic signal can be received at the reception voltage having substantially the same degree as that of the fundamental wave transmission/reception of the whole surface opening.

A first modification of the ultrasonic transducer of the third embodiment will be described with reference to FIG. 17A and FIG. 17B.

As shown in FIG. 17A and FIG. 17B, in the in-plane separated ultrasonic transducer of the modification example, a transmitting piezoelectric resonator 362 of the transmitting ultrasonic vibrator is a PZT ceramic disc vibrator, a receiving piezoelectric resonator 364 of the receiving ultrasonic vibrator for receiving the harmonic signal is an annular piezoelectric resonator of $KNbO_3$. Contrary to the aforementioned embodiment, the transmitting piezoelectric resonator 362 is positioned inside the receiving piezoelectric resonator 364.

When an opening area ratio R ($=S_r/S_t$) is 0.5, in accordance with relative setting of $Q_t$ and $Q_r$, the harmonic signal can be received at the signal level substantially of the same degree as that of the whole surface opening and fundamental wave transmission/reception as described above.

When the general PZT ceramic vibrator has an annular shape, dividing vibration occurs in the vicinity of the resonant frequency, and a satisfactory resonant characteristic cannot be obtained in many cases. However, when $KNbO_3$ is used in the annular piezoelectric resonator as in the present modification example, the resonant characteristic is largely improved. This fact has been experimentally confirmed by the present inventor, et al.

A second modification of the transmitting piezoelectric resonator of the third embodiment will next be described with reference to FIG. 18 to FIG. 20.

Figure 18:
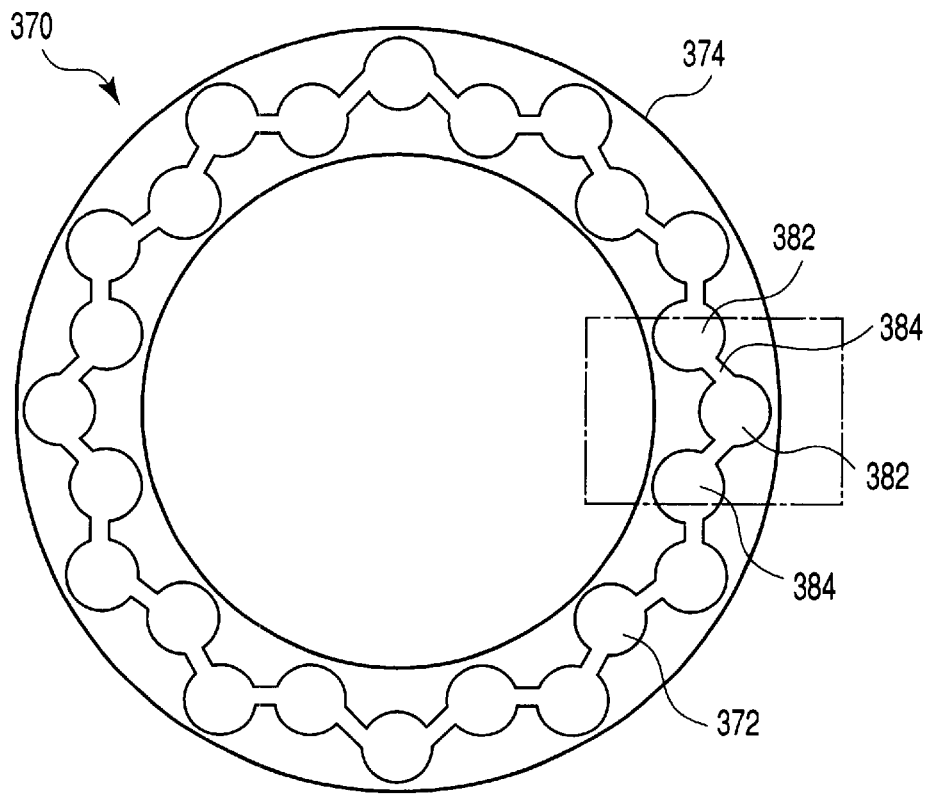
FIG. 18 is a plan view of the transmitting piezoelectric resonator having an energy trapped electrode structure according to the modification of the third embodiment.

In the third embodiment, the annular transmitting piezoelectric resonator has the whole surface electrode formed on the whole surface of the vibrator, but in the modification of the embodiment, as shown in FIG. 18, an annular transmitting piezoelectric resonator 370 has an energy trapped electrode structure 372.

Here, the term "energy enclosed electrode structure" indicates an electrode which partially covers a piezoelectric material face, and satisfies equation (10) described later.

The energy trapped electrode structure 372 has a pair of electrode plates disposed opposite to each other via an annular piezoelectric material 374. As shown in FIG. 19, one electrode plate of the pair, for example, the front electrode plate has a plurality of circular electrodes 382, and a thin wiring 384 via which the adjacent circular electrodes 382 are connected to each other. Moreover, as shown in FIG. 20, the other electrode plate of the pair, for example, the back electrode plate has the same number of circular electrodes 392 as that of circular electrodes 382, and a thin wiring 394 via which the adjacent circular electrodes 392 are connected to each other.

Figure 19:
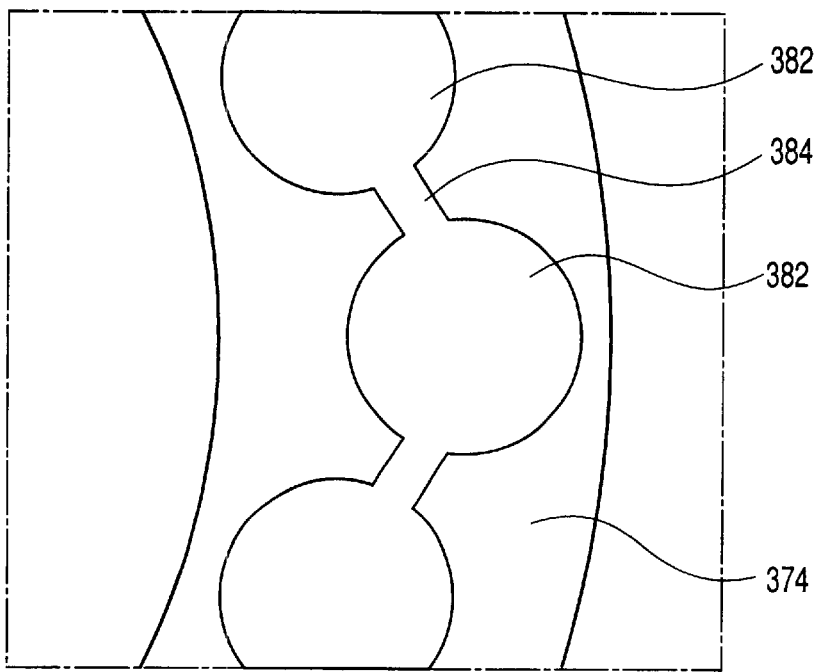
FIG. 19 is a diagram corresponding to a portion surrounded by a dashed line of FIG. 18, and shows a layout of an electrode plate on a front side of the energy trapped electrode structure.
Figure 20:
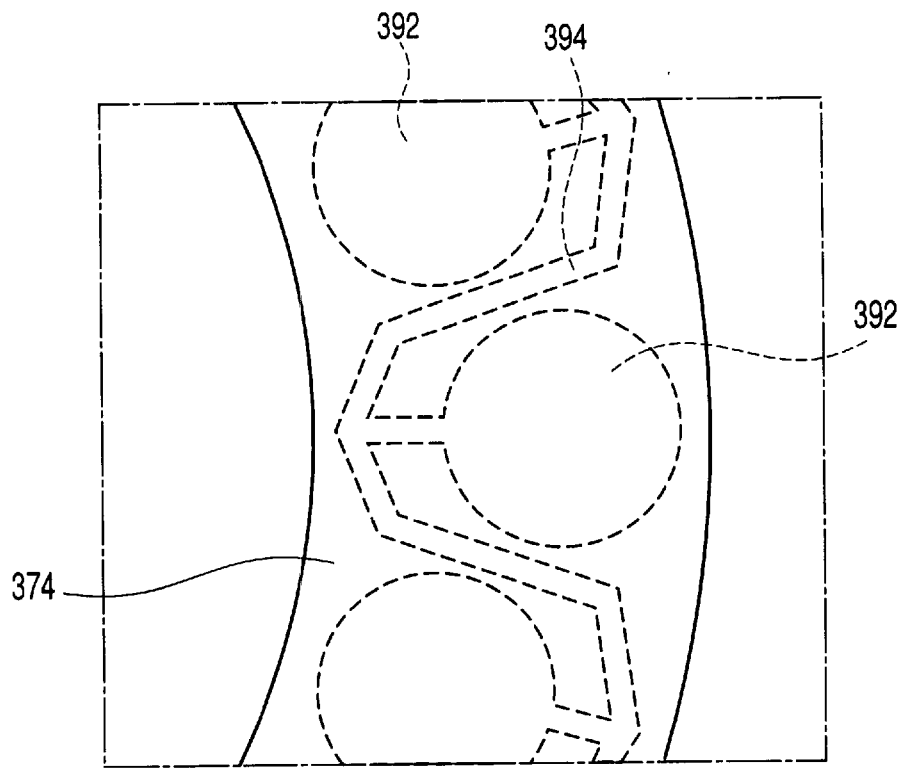
FIG. 20 is a diagram corresponding to the portion surrounded by the dashed line of FIG. 18, and shows a layout of the electrode plate on a back side of the energy trapped electrode structure.

As seen from FIG. 19 and FIG. 20, the circular electrode 382 is disposed opposite the circular electrode 392 via the piezoelectric material 374. The wiring 384 crosses over the wiring 394 only in one place, and there is no other place in which the wirings are disposed opposite each other via the piezoelectric material 374.

Furthermore, assuming that an electrode diameter is a, and a frequency drop ratio by electrode formation is D, a thickness h of the piezoelectric material 374 satisfies the following equation.

$$\frac{a}{2h}\sqrt{\Delta} < \frac{\sqrt{2}}{2}$$

The piezoelectric resonator is formed, for example, by forming the whole surface electrodes on opposite surfaces of the circular PZT piezoelectric material with the thickness satisfying the above formula, polarizing the electrode, and selectively etching the front and back whole surface electrodes by a process such as photolithography.

For the diameter of the circular electrode 382, a value of about ⅓ to ⅔ of a width w of the annular piezoelectric material 374 is selected. For the diameter of the circular electrode 392, a value smaller than the diameter of the circular electrode 382 by 5 to 10% is selected by considering a positional deviation during etching so that one of the pair of circular electrodes is prevented from projecting from the other electrode.

The electrode 382 on the ultrasonic emission side is connected to the front electrode of the disc-shaped piezoelectric resonator 304 disposed inside the annular piezoelectric resonator via a wiring 416, and connected to the housing 306 via a wiring 418 in FIG. 14.

For the annular piezoelectric resonator having the usual whole surface electrode, the dividing vibration sometimes occurs at the resonant frequency. The occurrence of the dividing vibration not only reduces a transmission ultrasonic sound pressure, but also displaces a ratio of the resonant frequency of the transmitting ultrasonic vibrator to the resonant frequency of the receiving ultrasonic vibrator from 1:2. This hinders transmission of the correct fundamental wave and reception of the harmonic signal.

Since the annular piezoelectric resonator of the present modification has the energy trapped electrode structure, the dividing vibration hardly occurs in the vicinity of the resonant frequency. This can accurately maintain the ratio of the resonant frequency of the transmitting ultrasonic vibrator to the resonant frequency of the receiving ultrasonic vibrator at 1:2, and this preferably realizes effective harmonic imaging.

When the energy trapped electrode is used in the piezoelectric resonator electrode in this manner, in the annular piezoelectric resonator, no unnecessary vibration component is superimposed, and the fundamental ultrasound formed only of the longitudinal ultrasonic component can efficiently be generated.

In the present modification example, the transmitting piezoelectric resonator having the energy trapped electrode has been illustrated as an improvement of the transmitting piezoelectric resonator, but the receiving piezoelectric resonator may have the energy trapped electrode as an improvement example of the receiving piezoelectric resonator. A large $Q_r$ is obtained by the receiving piezoelectric resonator having the energy trapped electrode, and a large reception voltage $V_m$ is accordingly obtained.

Additionally, the respective constitutions of the embodiments of the present invention can of course be modified and altered in various ways.

For example, in the third embodiment, the ultrasonic transducer has a circular opening, but the opening shape is not limited to a circle. The opening of the ultrasonic transducer may be, for example, rectangular, elliptical, or strip-shaped. Moreover, the ultrasonic transducer may be an electronic scanning array transducer, and each element constituting an array may have a fundamental wave transmitting vibrator and high order harmonic wave receiving vibrator in the same plane as in the third embodiment.

[Fourth Embodiment]

According to a fourth embodiment, there is provided an ultrasonic transducer system suitable for harmonic imaging ultrasonic diagnosis, which includes the ultrasonic transducer described in the third embodiment.

Figure 21:
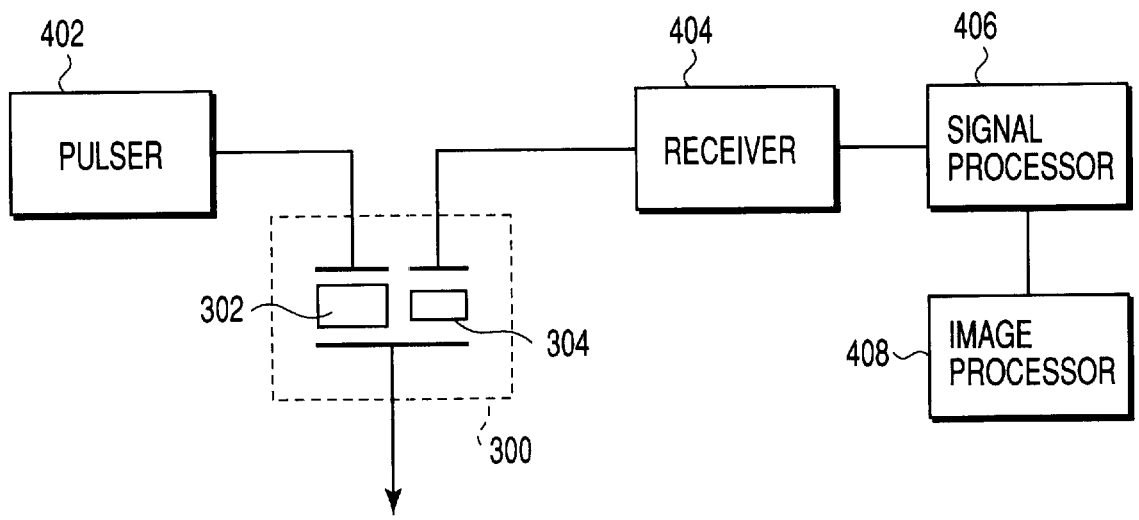
FIG. 21 shows an ultrasonic transducer system including the ultrasonic transducer of FIG. 14 according to a fourth embodiment.

As shown in FIG. 21, the ultrasonic transducer system includes the ultrasonic transducer 300, and a pulser circuit 402 for supplying a drive pulse signal to the transmitting piezoelectric resonator 302 of the ultrasonic transducer 300. In one example, the pulser circuit 402 generates a high-voltage spike wave if necessary, and can adjust a pulse width and fall time. In another example, the pulser circuit 402 generates a high-voltage trapezoidal wave if necessary, and can adjust the pulse width and fall time. In a further example, the pulser circuit 402 generates a high-voltage burst wave if necessary, and can adjust a burst length and window function.

The ultrasonic transducer system further has a receiver circuit 404 for receiving the output signal of the receiving piezoelectric resonator 304 of the ultrasonic transducer 300, a signal processor circuit 406 for processing a signal from the receiver circuit 404, and an image processor circuit 408 for forming a signal from the signal processor circuit 406 into an image. The image obtained by the image processor circuit 408 is finally displayed on a monitor screen (not shown).

The present invention is applied to ultrasonic diagnosis in which the second order or third order harmonic signal is utilized. In ultrasonic diagnosis, the fundamental ultrasound is required not to contain frequency components other than the component of the center frequency $f_0$, particularly not to contain the $2f_0$ or $3f_0$ frequency component. Particularly, when the fundamental ultrasound contains the $2f_0$ or $3f_0$ frequency component, during reception, it is impossible to distinguish the harmonic signal as a detection object from the $2f_0$ or $3f_0$ frequency component mixed beforehand in the fundamental ultrasound.

For this reason, when a second order harmonic signal is utilized in the ultrasonic diagnosis, the ultrasound transmitted from the transmitting ultrasonic vibrator preferably contains no $2f_0$ frequency component. Similarly, when a third order harmonic signal is utilized in the ultrasonic diagnosis, the ultrasound transmitted from the transmitting ultrasonic vibrator preferably contains no $3f_0$ frequency component.

Figure 22A:
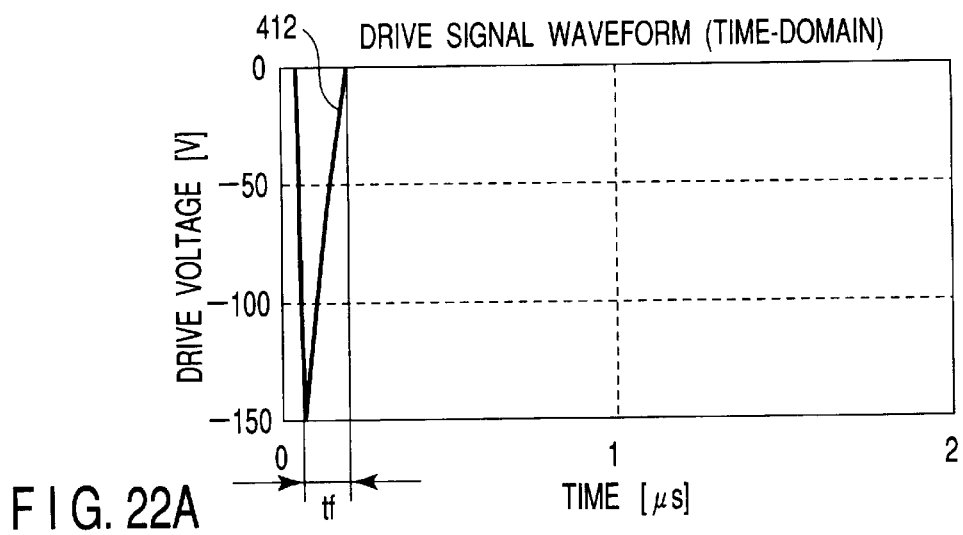
FIG. 22A shows a drive voltage waveform of a spike wave as one example of a drive signal supplied to the transmitting piezoelectric resonator.
Figure 22B:
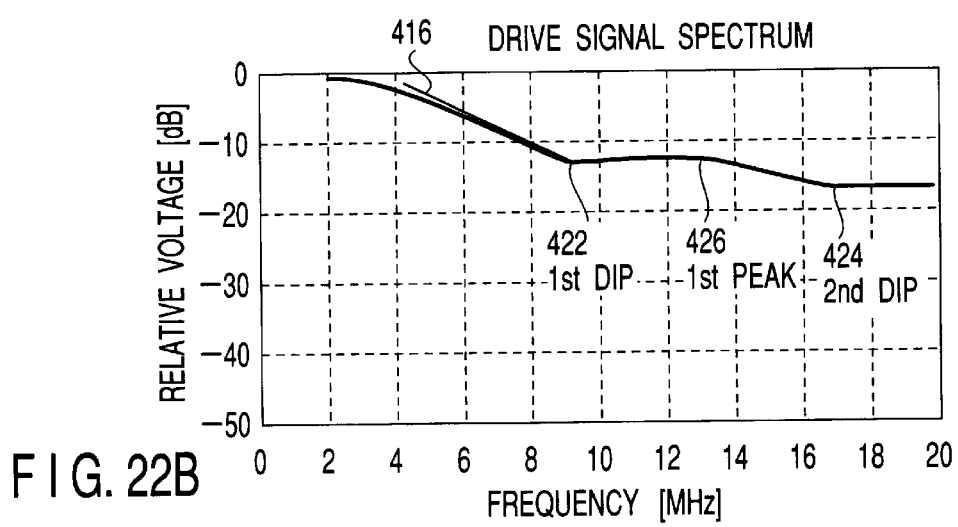
FIG. 22B shows a frequency characteristic of the wave.
Figure 23:
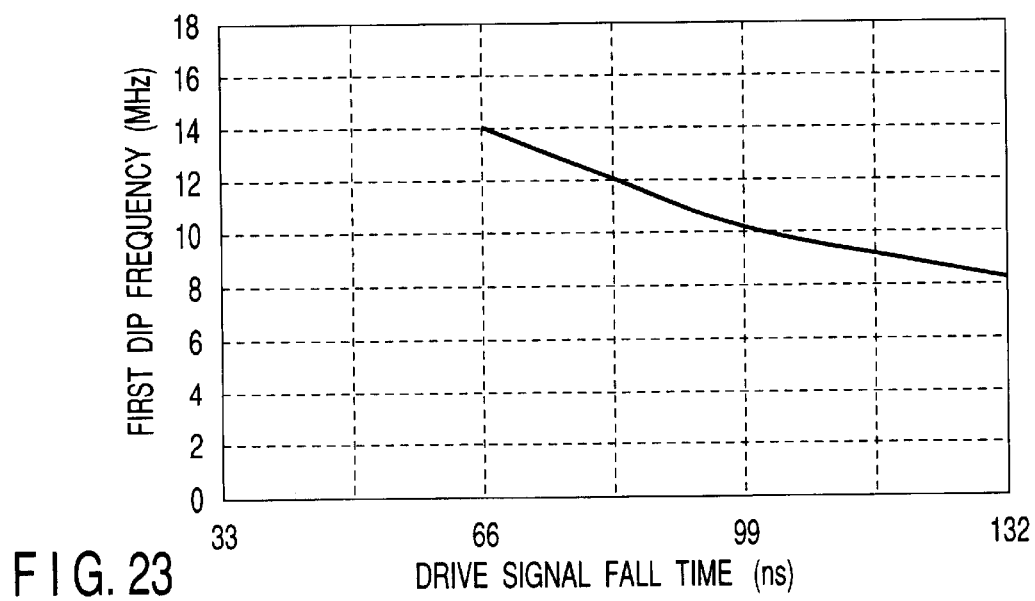
FIG. 23 shows a change of a first dip frequency for a fall time with respect to the spike wave shown in FIG. 22A.

FIG. 22A shows a drive voltage waveform 412 of the spike wave as one example of the drive signal supplied to the transmitting piezoelectric resonator. FIG. 22B shows a frequency characteristic of the drive voltage waveform 412 of the spike wave, and shows a negative inclination 416 in the vicinity of a first dip frequency, first dip frequency 422, second dip frequency 424, and first peak frequency 426. Such trapezoidal wave cannot strictly realize a δ function or a rectangular wave as an ideal drive waveform, and is a waveform generally utilized as an actual drive signal waveform in a pulse echo diagnosis method.

As seen from FIG. 22B, the frequency characteristic of the drive voltage waveform 412 of the spike wave indicates a peak/dip characteristic and whole drooping characteristic. It is well known that the frequency characteristic of the d function indicates neither the peak/dip characteristic nor the whole drooping characteristic. When the peak/dip characteristic has a pulse width on a time axis, the characteristic appears. It is further found that the whole drooping characteristic and deterioration of steepness of a level change in the peak/dip frequency appear by disposing a fall inclination.

A spectrum T (jω) of the transmitted ultrasonic signal is represented by a product of a response signal spectrum H(jω) and drive waveform spectrum D(jω) during d function driving as represented in the following equation (11).

$$T(j\omega)=H(j\omega)\cdot D(j\omega) \qquad (11)$$

It is understood from this equation that when D(jω) has a dip, that is, a drop of the level in the frequency characteristic in $2f_0$, transmission waveform T(jω) also has a drop in the frequency, and as a result the $2f_0$ component of the fundamental ultrasound to be transmitted is inhibited.

As shown in FIG. 22B, the drive signal waveform having the spectrum such that the frequency of the first dip 422 is $2f_0$ is used, and the transmission spectrum T(jω) with the inhibited $2f_0$ component can therefore be obtained.

FIG. 24 shows the characteristic of the first dip frequency with respect to a fall time tf in the frequency characteristic of the drive signal of the spike wave. It is seen from a characteristic curve of the first dip frequency shown in FIG. 24 that the fundamental ultrasound with the inhibited $2f_0$ component can be obtained by setting the fall time tf to 99 ns in detection of the second order harmonic signal with a frequency of 10 MHz. As a result, a level down of −2.5 [dB/MHz]×(10 MHz−5 MHz)=−12.5 dB can be realized. On the other hand, the level down in the dip decreases, but apparently the level down of −12.5 dB or more can be realized due to both effects.

When the spike wave fall time is appropriately selected in this manner, the fundamental ultrasound with the $2f_0$ or $3f_0$ component inhibited therein can be generated.

Figure 24A:
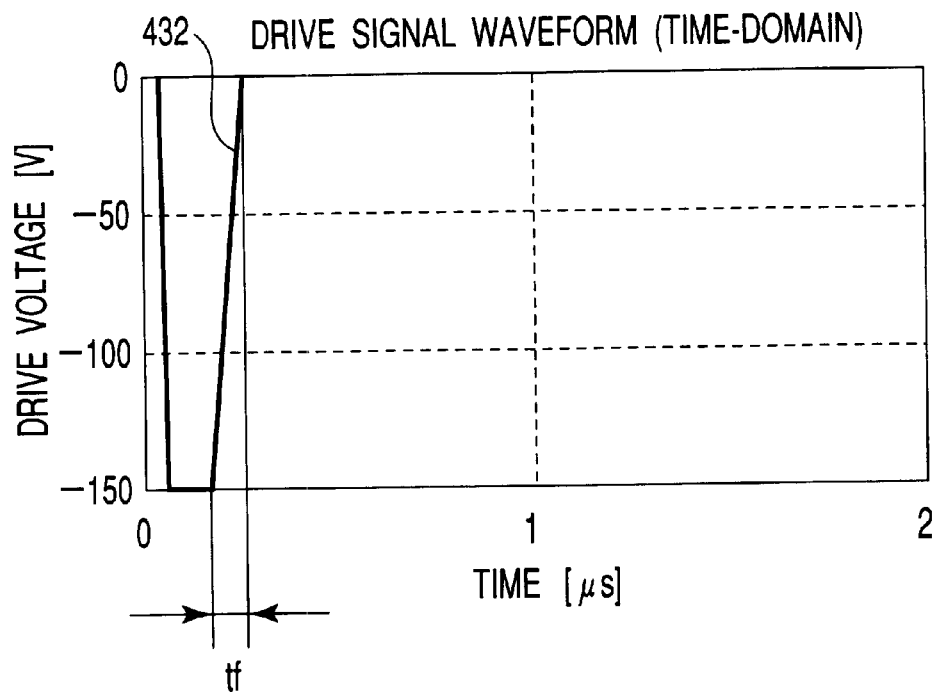
FIG. 24A shows the drive voltage waveform of a trapezoidal wave as another example of the drive signal supplied to the transmitting piezoelectric resonator.
Figure 24B:
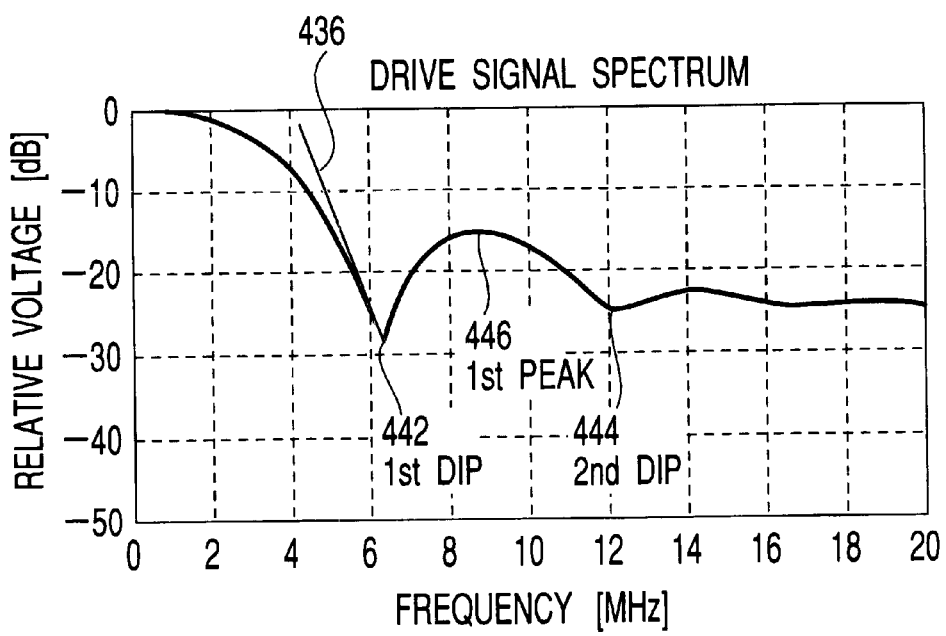
FIG. 24B shows the frequency characteristic of the wave.

Moreover, FIG. 24A shows a drive voltage waveform 432 of a trapezoidal wave as another example of the drive signal supplied to the transmitting piezoelectric resonator. FIG. 24B shows the frequency characteristic of the drive voltage waveform 432 of the trapezoidal wave, and shows a negative inclination 436 in the vicinity of the first dip frequency, first dip frequency 442, second dip frequency 444, and first peak frequency 446.

Also in the trapezoidal wave, similar to the aforementioned spike wave, a specific relation is established between the first dip frequency and the fall time. Therefore, the fundamental ultrasound with the $2f_0$ or $3f_0$ component inhibited therein can be generated by appropriately selecting the fall time.

FIG. 25A shows the drive voltage waveform of a burst wave as another example of the drive signal supplied to the transmitting piezoelectric resonator, and FIG. 25B shows the frequency characteristic. In this case, since a core of a burst wave 452 is a sine wave, a side lobe is remarkably small, a main lobe band width is also small by about −30 dB, and an ideal drive signal waveform is obtained.

Figure 26:
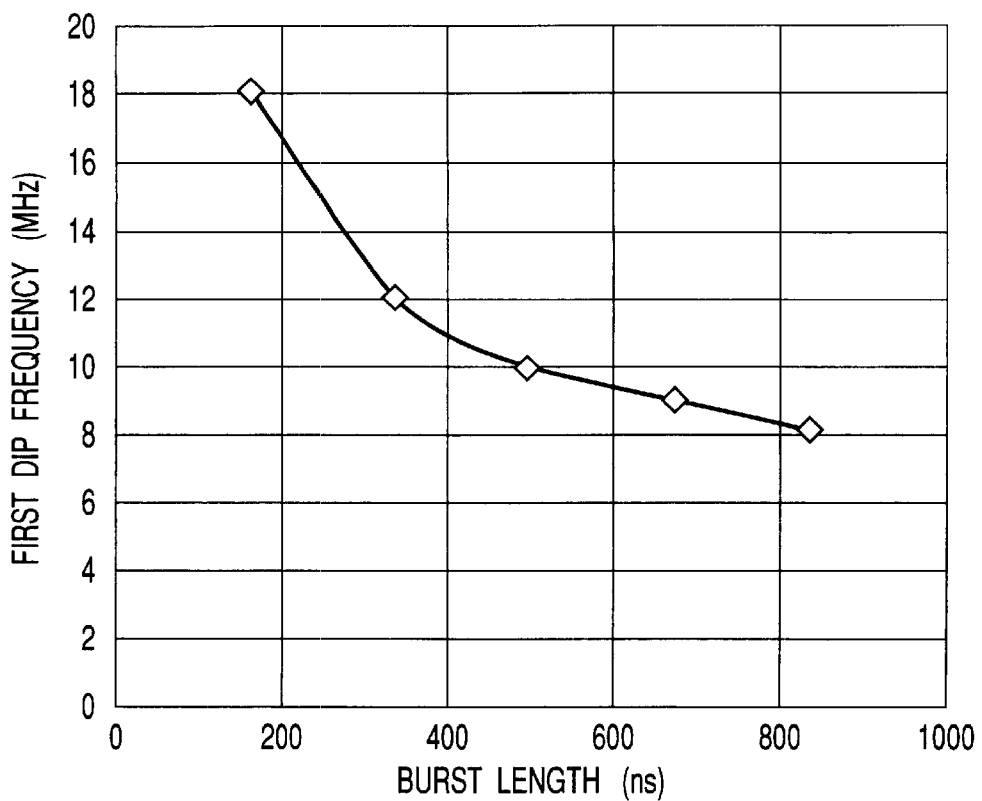
FIG. 26 shows the change of the first dip frequency with respect to the burst wavelength for the spike wave shown in FIG. 25A.

Also in the burst wave, a burst length tp and first dip frequency have a relation shown in FIG. 26. Therefore, the first dip frequency can be controlled by adjusting the burst length tp. Therefore, when the drive signal having the spectrum D(jω) is used, a transmitted wave with either $2f_0$ or $3f_0$ frequency component completely inhibited therein can be obtained.

In the ultrasonic transducer system of the fourth embodiment, the center frequency of the pulser circuit 402 is $f_0$, and the circuit supplies the drive pulse signal having the frequency characteristic with the first dip frequency of $2f_0$ to the transmitting ultrasonic vibrator. Thereby, the ultrasound with the $2f_0$ component inhibited therein is generated from the transmitting ultrasonic vibrator.

Alternatively, the pulser circuit 402 may supply the drive pulse signal having the frequency characteristic with the center frequency being in $f_0$ and the first dip frequency being in $3f_0$ to the transmitting ultrasonic vibrator. Thereby, the ultrasound with the $3f_0$ component inhibited therein is generated from the transmitting ultrasonic vibrator.

According to the fourth embodiment, the ultrasound with the inhibited $2f_0$ or $3f_0$ component can be transmitted by controlling the drive signal waveform. As a result, the second order or third order harmonic signal generated in the object by the fundamental ultrasound can be received at a high S/N.

Additionally, the respective constitutions of the embodiment of the present invention can of course be modified or changed in various ways.

For example, in the fourth embodiment, the ultrasonic transducer has a circular opening, but the opening shape is not limited to circle. The opening of the ultrasonic transducer may be, for example, rectangular, elliptical, or strip-shaped. Moreover, the ultrasonic transducer may be an electronic scanning array transducer, and each element constituting the array may have a fundamental wave transmitting vibrator and high order harmonic wave receiving vibrator in the same plane as in the fourth embodiment.

[Fifth Embodiment]

The ultrasonic transducer of a fifth embodiment will be described with reference to FIG. 27.

Figure 27:
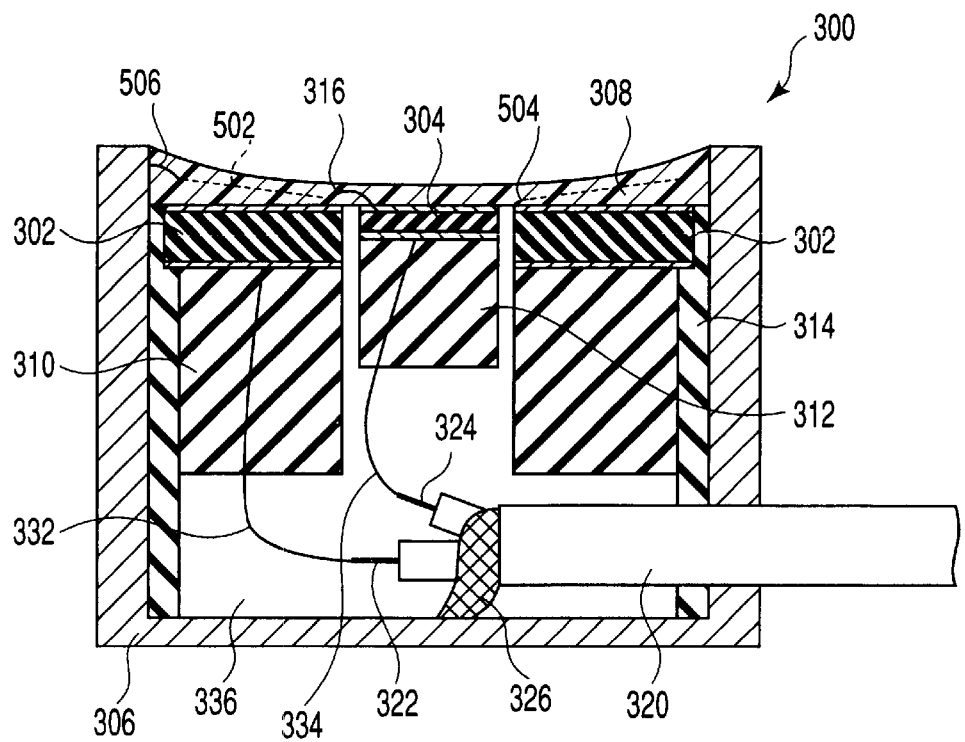
FIG. 27 is a sectional view of the in-plane separated ultrasonic transducer of a fifth embodiment.

The ultrasonic transducer of the fifth embodiment is similar to the ultrasonic transducer described in detail in the third embodiment with reference to FIG. 14, and in FIG. 27, members denoted with the same reference numerals as those of FIG. 14 are equivalent members.

The ultrasonic transducer of the fifth embodiment has a thin-piece spiral heater 502 inside the acoustic lens 308. One end of the heater 502 is electrically connected to the surface electrode of the transmitting piezoelectric resonator 302 via a fine conductor 504, and the other end thereof is connected to the housing 306 via fine conductor 506. The spiral thin-piece heater 502 is preferably disposed as close as possible to the transmitting piezoelectric resonator 302 to such an extent that the heater does not contact the electrode on the ultrasonic emission surface side of the transmitting piezoelectric resonator 302.

The heater 502 gives a temperature gradient to the transmitting piezoelectric resonator 302 along a thickness direction, and gives a functionally gradient characteristic to at least one of the piezoelectric constant and permittivity.

It is known that the vibrator characteristic can be changed by imparting the functionally gradient characteristic to the piezoelectric constant or the permittivity of the piezoelectric resonator (Akira Yamada: "Piezoelectric Function Inclination type Broad Band Ultrasonic Transducer" in commemoration of 2000, Advanced Technique Symposium "Piezoelectric Material and Elastic Wave Device" Text (February, 2000) pp. 31 to 38).

Figure 28:
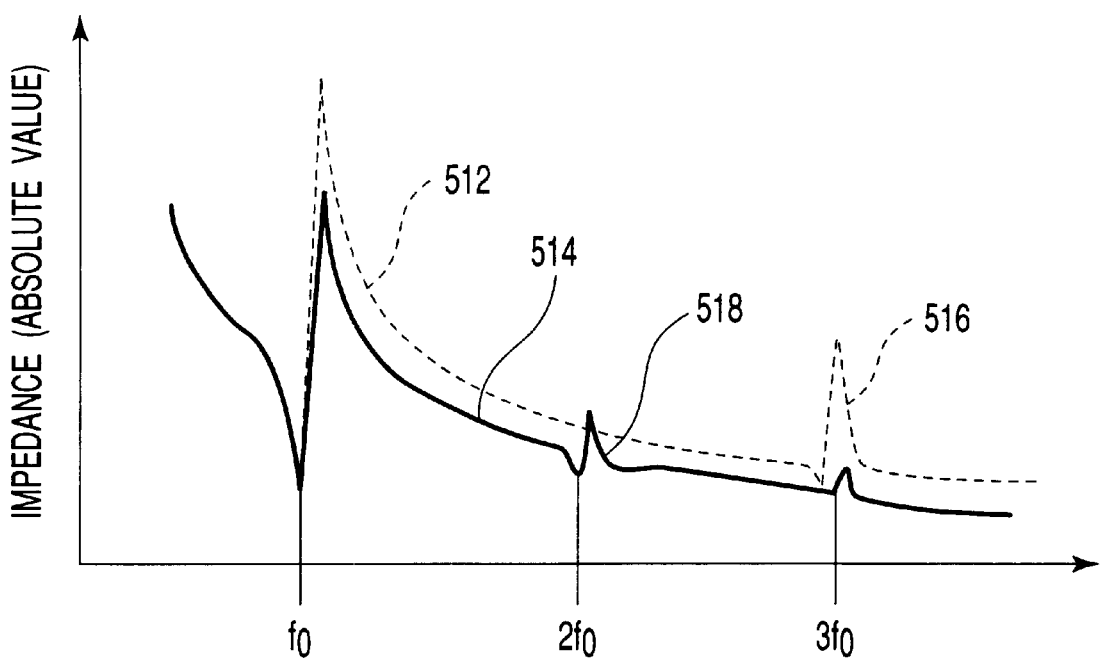
FIG. 28 shows an impedance characteristic of the piezoelectric resonator having a functionally gradient characteristic in a piezoelectric constant and the piezoelectric resonator having no functionally gradient characteristic.

In FIG. 28, a broken line 512 shows an impedance characteristic of the piezoelectric resonator having no functionally gradient, and a solid line 514 shows the impedance characteristic of the piezoelectric resonator having the functionally gradient characteristic with the piezoelectric constant $e_{33}$.

As seen from FIG. 28, in the piezoelectric resonator having the functionally gradient characteristic, a third order piezoelectric vibration 516 largely generated in the piezoelectric resonator having no functionally gradient characteristic is inhibited. Therefore, the third order piezoelectric vibration 516 can be inhibited by imparting the functionally gradient characteristic to the transmitting piezoelectric resonator.

In the ultrasonic transducer of the fifth embodiment, the functionally gradient characteristic is imparted to the transmitting piezoelectric resonator 302 by heating the vibrator by the heater 502, with the intention of inhibiting third order piezoelectric vibration.

Since the transmission/reception of the ultrasound in the ultrasonic transducer of the fifth embodiment is the same as that of the ultrasonic transducer shown in FIG. 14, a description thereof is omitted to avoid redundancy. Only a part associated with the heater 502 will be described hereinafter.

When the drive signal, for example, a burst wave signal is applied between the housing 306 and the wiring 332 in the transmitting piezoelectric resonator 302, a current flows through the wiring 332, transmitting piezoelectric resonator 302, conductor 504, spiral thin-piece heater 502, conductor 506, and housing 306 in order. When current flows through the spiral thin-piece heater 502, the current is converted into Joule heat. Since the spiral thin-piece heater 502 is disposed in the vicinity of the transmitting piezoelectric resonator 302, the heat generated in the spiral thin-piece heater 502 is efficiently transmitted to the transmitting piezoelectric resonator 302.

On the other hand, the backing layer 310 formed, for example, of a resin with a tungsten powder densely dispersed in a satisfactorily thermally conductive silicone resin, is bonded to the back surface of the transmitting piezoelectric resonator 302. Furthermore, the space 336 inside the housing 306 is also filled with a material having a satisfactory thermal conductivity such as the silicone resin. Therefore, the heat transmitted through the transmitting piezoelectric resonator 302 is satisfactorily radiated from the back surface side of the vibrator.

As a result, a temperature gradient is generated in the thickness direction of the transmitting piezoelectric resonator 302, and the functionally gradient characteristic concerning the permittivity and/or the piezoelectric constant is imparted into the transmitting piezoelectric resonator 302. Therefore, as described with reference to FIG. 28, the third order piezoelectric vibration of the transmitting piezoelectric resonator 302 is inhibited. Thereby, the ultrasound in which the component of $3f_0$ is inhibited is generated from the transmitting ultrasonic vibrator.

In the fifth embodiment, the third order piezoelectric vibration of the transmitting piezoelectric resonator 302 is inhibited. On the other hand, a second order piezoelectric vibration 518 of the transmitting piezoelectric resonator 302 is excited. Therefore, the ultrasonic transducer of the fifth embodiment may be combined with the drive control for inhibiting the component of $2f_0$ described in the fourth embodiment.

The temperature gradient to be applied to the transmitting piezoelectric resonator 302 strongly depends on the temperature characteristic of the permittivity or the piezoelectric constant of the transmitting piezoelectric resonator 302. Generally, it is known that with a lower Curie point of the piezoelectric resonator, dependence of the permittivity or the piezoelectric constant on temperature increases, and a temperature difference to be applied to the front/back surface of the piezoelectric resonator may be small.

For example, to impart the functionally gradient characteristic such that the permittivity is 3200 on the front surface and 2200 on the back surface of the vibrator to the transmitting piezoelectric resonator 302, when the temperature characteristic of the permittivity of the transmitting piezoelectric resonator 302 changes by 1% per 1° C., the temperature difference to be applied to the front/back surface may be around 26° C.

According to the fifth embodiment, when the functionally gradient characteristic regarding the permittivity and/or the piezoelectric constant is imparted to the transmitting piezoelectric resonator, the third order piezoelectric vibration is inhibited. Furthermore, when the drive control described in the fourth embodiment is combined for use, the ultrasonic pulse close to the ideal waveform only of the fundamental wave component is transmitted from the transmitting ultrasonic vibrator.

Additionally, the respective constitutions of the embodiment of the present invention can of course be modified or changed in various ways.

For example, in the fifth embodiment, the ultrasonic transducer has a circular opening, but the opening shape is not limited to a circle. The opening of the ultrasonic transducer may be, for example, rectangular, elliptical, or strip-shaped. Moreover, the ultrasonic transducer may be an electronic scanning array transducer, and each element constituting the array may have a fundamental wave transmitting vibrator and high order harmonic wave receiving vibrator disposed in the same plane as in the fifth embodiment.

In the fifth embodiment, the example in which means for imparting the temperature gradient comprises the spiral thin-piece heater has been described, but the means for imparting the temperature gradient may be other means, such as a Peltier element. Particularly, since the Peltier element has a cooling end on one end thereof and a heating end on the other end thereof, a heat utilization efficiency is high, and controllability is also satisfactory. Therefore, the element can be said to be preferable means when there is an allowance in an outer dimension of the transducer.

As another modification of the ultrasonic transducer, an ultrasonic transducer including the transmitting piezoelectric resonator having the functionally gradient characteristic in at least one of the piezoelectric constant and the permittivity will be described.

In the fifth embodiment, for the object of inhibiting the third order piezoelectric vibration of the transmitting piezoelectric resonator 302, the ultrasonic transducer including the means for imparting the functionally gradient characteristic to the transmitting piezoelectric resonator 302 has been described. However, in order to achieve the same object, instead of disposing the means on the ultrasonic transducer, the transmitting piezoelectric resonator itself may include the functionally gradient characteristic on at least one of the piezoelectric constant and the permittivity.

Figure 29:
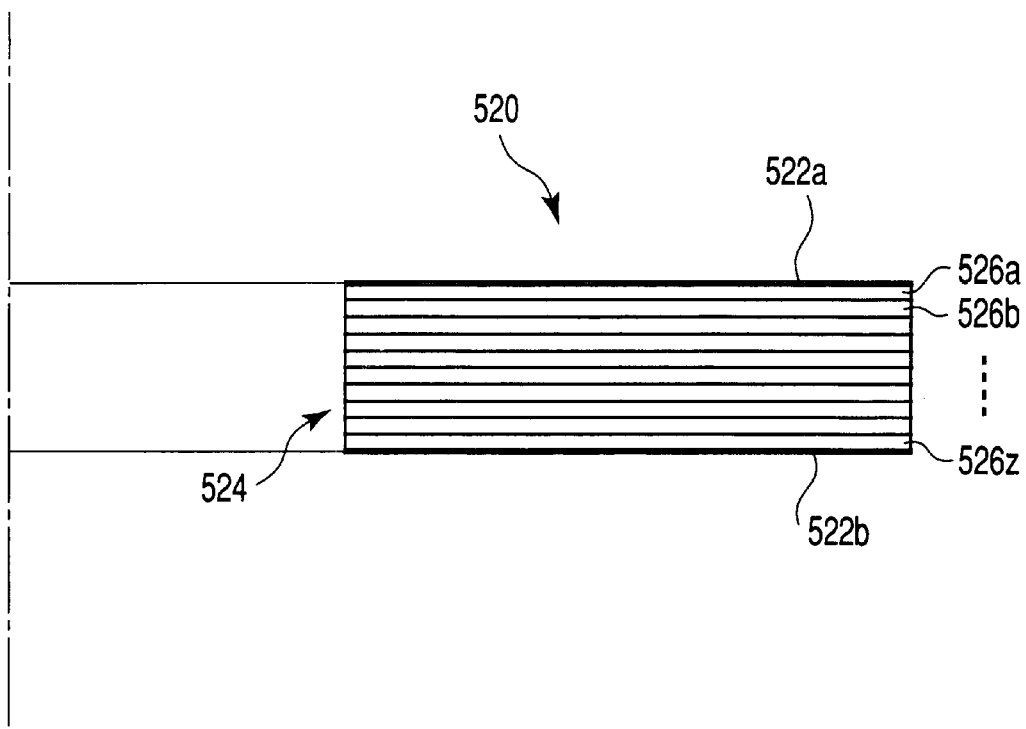
FIG. 29 is a partial sectional view of the functionally gradient type piezoelectric resonator replaced with the ultrasonic transducer transmitting piezoelectric resonator of FIG. 14 in the modification of the fifth embodiment.

The ultrasonic transducer of the present modification is structured by replacing the transmitting piezoelectric resonator 302 with the piezoelectric resonator having the functionally gradient characteristic in the ultrasonic transducer shown in FIG. 14. FIG. 29 shows a partial section of a functionally gradient piezoelectric resonator 520 having the functionally gradient characteristic, with which the transmitting piezoelectric resonator 302 of the ultrasonic transducer of FIG. 14 is replaced.

The functionally gradient piezoelectric resonator 520 has a pair of electrodes 522a, 522b, and a piezoelectric layer 524 held between the electrodes. The piezoelectric layer 524 has a plurality of piezoelectric thin films 526a, 526b, ..., 526z laminated on one another. Each of the piezoelectric thin films slightly differs in the permittivity and/or the piezoelectric constant along a lamination direction with respect to the adjacent piezoelectric thin film.

Figure 30:
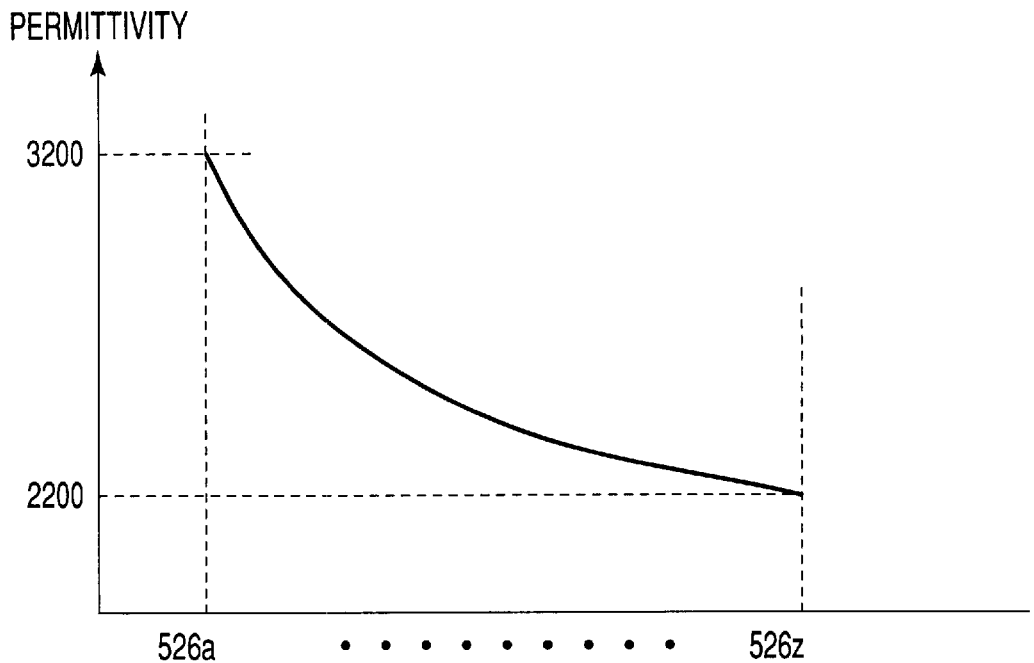
FIG. 30 shows the whole function characteristic of the functionally gradient type piezoelectric resonator of FIG. 29.
Figure 31:
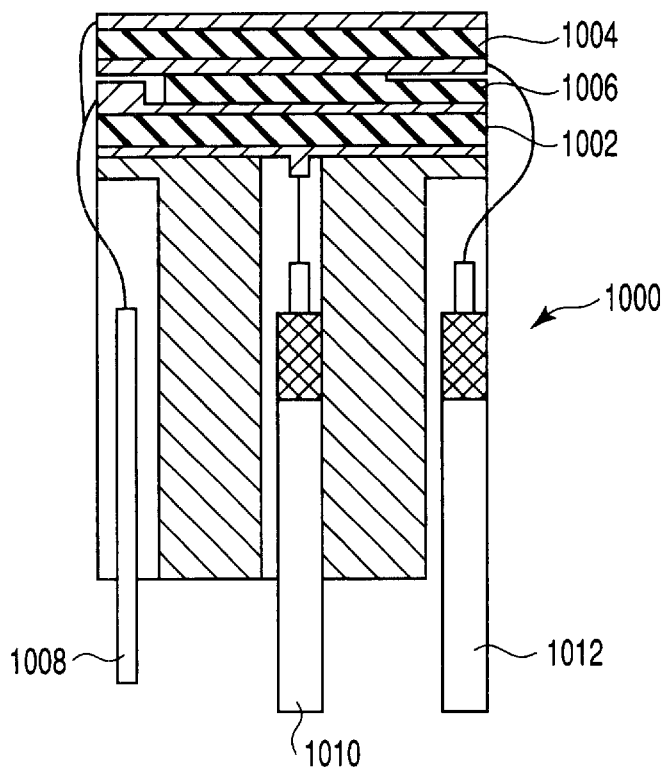
FIG. 31 shows a conventional ultrasonic transducer having transmitting and receiving piezoelectric resonators superposed onto each other.

For example, for the piezoelectric thin films 526a, 526b, ..., 526z, there is almost no difference in other constants excluding the permittivity and including the Curie point. The uppermost piezoelectric thin film, that is, the ultrasonic emission surface side piezoelectric thin film 526a has a permittivity of 3200, and the lowermost piezoelectric thin film 526z has a permittivity of 2200. As a whole, the films have the functionally gradient characteristic shown in FIG. 30.

The piezoelectric resonator 520 itself having the functionally gradient characteristic has a large inclination as compared with the functionally gradient characteristic created by imparting the temperature gradient to the piezoelectric resonator having no functionally gradient characteristic. Therefore, the third order piezoelectric vibration 516 is more dramatically inhibited.

The piezoelectric layer of the functionally gradient piezoelectric resonator is not limited to the lamination of the piezoelectric thin films different in the permittivity and/or the piezoelectric constant from one another. At least one of the piezoelectric constant and the permittivity may only have the functionally gradient characteristic. For example, the layer may be formed by diffusing an impurity ion from one surface of a plate-shaped piezoelectric material.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An ultrasonic transducer system for harmonic imaging, comprising:
   an ultrasonic transducer comprising a transmitting ultrasonic vibrator for transmitting a fundamental ultrasound having a center frequency $f_0$, and a receiving ultrasonic vibrator for receiving a harmonic signal having a center frequency $nf_0$ (n is an integer of 2 or more); and
   control means for controlling the ultrasonic transducer, wherein said transmitting ultrasonic vibrator comprises a transmitting piezoelectric resonator, said transmitting piezoelectric resonator comprises a pair of electrodes, said receiving ultrasonic vibrator comprises a receiving piezoelectric resonator, said receiving resonator comprises a pair of electrodes, the transmitting piezoelectric resonator and the receiving piezoelectric resonator are superposed and disposed in layers, and
   said control means supplies a drive signal to the transmitting piezoelectric resonator only for a time $t_1$, holds a state between electrodes of the receiving piezoelectric resonator in a low resistance state including a short circuit for a predetermined time $t_2$ ($>t_1$) after the drive signal is supplied, and holds the state between the electrodes of the transmitting piezoelectric resonator in a high resistance state including an open circuit after an elapse of the predetermined time $t_2$, until the next drive signal is supplied to the transmitting piezoelectric resonator.

2. The ultrasonic transducer system according to claim 1, wherein said control means comprises an inductance circuit for holding the state between the electrodes of the receiving piezoelectric resonator in a low resistance state including the short circuit state for a specific time.

3. The ultrasonic transducer system according to claim 1, wherein said control means comprises an on/off control device, disposed in a final stage of a circuit for supplying the drive signal to the transmitting piezoelectric resonator, for holding the high resistance state including the open circuit.

4. The ultrasonic transducer system according to claim 1, wherein said receiving piezoelectric resonator comprises a polymeric piezoelectric material.

5. The ultrasonic transducer system according to claim 1, wherein said receiving piezoelectric resonator comprises a composite piezoelectric material.

6. The ultrasonic transducer system according to claim 4, wherein said polymeric piezoelectric material is directly disposed on the surface of the transmitting piezoelectric resonator on an ultrasonic emission side.

7. The ultrasonic transducer system according to claim 4, wherein said polymeric piezoelectric material is disposed on the surface of the transmitting piezoelectric resonator on an ultrasonic emission side via an acoustic matching layer.

8. The ultrasonic transducer system according to claim 6, wherein said polymeric piezoelectric material comprises a polymeric film in which a piezoelectric property is spontaneously generated by polarizing a surface energy.

9. The ultrasonic transducer system according to claim 7, wherein said polymeric piezoelectric material comprises a polymeric film in which a piezoelectric property is spontaneously generated by polarizing a surface energy.

10. The ultrasonic transducer system according to claim 1, wherein said transmitting ultrasonic vibrator and said receiving ultrasonic vibrator comprise a damping layer (backing layer) disposed on the back surface of the transmitting piezoelectric resonator, and an acoustic lens disposed on the front surface of the receiving piezoelectric resonator in common.

11. The ultrasonic transducer system according to claim 10, wherein said acoustic lens comprises an acoustic matching function.

12. The ultrasonic transducer system according to claim 10, wherein said acoustic lens comprises an opening surface having a constant curvature radius, and the curvature radius of the opening surface has a value equal to an average value of an acoustic focal length for the ultrasound having the center frequency $f_0$ and an acoustic focal length for the ultrasound having the center frequency $nf_0$ (n is an integer of 2 or more).

13. The ultrasonic transducer system according to claim 10, wherein said acoustic lens comprises an opening surface having a curvature radius which partially differs.

14. An ultrasonic transducer for harmonic imaging, comprising:
   a transmitting ultrasonic vibrator including a transmitting piezoelectric resonator, for transmitting a fundamental ultrasound having a center frequency f0; and
   a receiving ultrasonic vibrator including a receiving piezoelectric resonator, for receiving a harmonic signal having a center frequency $nf_0$ (n is an integer of 2 or more),
   wherein said transmitting piezoelectric resonator has an annular band shape, said receiving piezoelectric resonator has a disc shape, said receiving piezoelectric resonator is disposed inside said transmitting piezoelectric resonator, and said transmitting piezoelectric resonator and said receiving piezoelectric resonator have different thicknessess.

15. The ultrasonic transducer according to claim 14, wherein said transmitting piezoelectric resonator is thicker than said receiving piezoelectric resonator.

16. The ultrasonic transducer according to claim 14, further comprising an acoustic lens disposed in front of the transmitting piezoelectric resonator and the receiving piezoelectric resonator and provided with an acoustic matching function, wherein said transmitting ultrasonic vibrator and said receiving ultrasonic vibrator partially include the acoustic lens.

17. The ultrasonic transducer according to claim 14, wherein said transmitting ultrasonic vibrator further comprises a damping layer disposed on the back surface of the transmitting piezoelectric resonator, said receiving ultrasonic vibrator further comprises a damping layer disposed on the back surface of the receiving piezoelectric resonator, and these damping layers have different thickness values.

18. The ultrasonic transducer according to claim 14, wherein said acoustic lens comprises an opening surface having a curvature radius which partially differs.

19. The ultrasonic transducer according to claim 18, wherein said acoustic lens comprises a first portion positioned in front of the transmitting piezoelectric resonator and a second portion positioned in front of the receiving piezoelectric resonator, the first portion of the acoustic lens comprises the opening surface having a constant curvature radius $R_t$, and the second portion of the acoustic lens comprises the opening surface having a constant curvature radius $R_r$ smaller than the curvature radius $R_t$.

20. The ultrasonic transducer according to claim 19, wherein said receiving piezoelectric resonator projects forward from the transmitting piezoelectric resonator.

21. The ultrasonic transducer according to claim 19, wherein said curvature radius $R_t$ of the opening surface of the first portion of the acoustic lens has a value equal to an acoustic focal length for the ultrasound having the center frequency $f_0$, and said curvature radius $R_r$ of the opening surface of the second portion of the acoustic lens has a value equal to an acoustic focal length for the ultrasound having the center frequency $nf_0$ (n is an integer of 2 or more).

22. The ultrasonic transducer according to claim 19, wherein said first portion of the acoustic lens has a thickness which is ¼ of a wavelength corresponding to the frequency $f_0$ on average, and said second portion of the acoustic lens has a thickness which is ¼ of a wavelength corresponding to the frequency $nf_0$ on average.

23. The ultrasonic transducer according to claim 14, wherein said acoustic lens comprises an opening surface having a constant curvature radius.

24. The ultrasonic transducer according to claim 23, wherein said acoustic lens comprises a first portion positioned in front of the transmitting piezoelectric resonator and a second portion positioned in front of the receiving piezoelectric resonator, the first portion of the acoustic lens has an average thickness $T_t$ equal to ¼ of a wavelength of the ultrasound having the fundamental frequency $f_0$, and the second portion of the acoustic lens has an average thickness $T_r$ equal to ¼ of a wavelength of the ultrasound having the fundamental frequency $nf_0$ (n is an integer of 2 or more).

25. The ultrasonic transducer according to claim 24, wherein an opening surface of the acoustic lens has a curvature radius equal to a radius of a spherical surface which circumscribes a circle obtained by connecting a point of the average thickness $T_t$ of the first portion of the acoustic lens, and a circle obtained by connecting a point of the average thickness $T_r$ of the second portion of the acoustic lens.

26. An ultrasonic transducer for harmonic imaging, comprising:

a plurality of transmitting ultrasonic vibrators for transmitting a fundamental ultrasound having a center frequency $f_0$, each of said transmitting ultrasonic vibrators comprises a transmitting piezoelectric resonator and an acoustic lens disposed in front of the transmitting piezoelectric resonator, said transmitting ultrasonic vibrator further comprises a damping layer disposed on the back surface of the transmitting piezoelectric resonator; and a plurality of receiving ultrasonic vibrators for receiving a harmonic signal having a center frequency $nf_0$ (n is an integer of 2 or more), each of said receiving ultrasonic vibrators comprises a receiving piezoelectric resonator and an acoustic lens disposed in front of the receiving piezoelectric resonator, the acoustic lens of the receiving ultrasonic vibrator having a curvature radius smaller than a curvature radius of the acoustic lens of the transmitting ultrasonic vibrator, said receiving ultrasonic vibrator further comprises a damping layer disposed on the back surface of the receiving piezoelectric resonator, where the damping layers have different thickness values, wherein said transmitting ultrasonic vibrators and said receiving ultrasonic vibrators are alternately disposed in radial form.

27. An ultrasonic transducer for harmonic imaging, comprising:

a transmitting ultrasonic vibrator for transmitting a fundamental ultrasound having a center frequency $f_0$ in response to input of an electric signal; and a receiving ultrasonic vibrator for receiving a harmonic signal having a center frequency $nf_0$ (n is an integer of 2 or more) generated in an object by the fundamental ultrasound, wherein said transmitting ultrasonic vibrator comprises a transmitting piezoelectric resonator, said receiving ultrasonic vibrator comprises a receiving piezoelectric resonator, the transmitting piezoelectric resonator and the receiving piezoelectric resonator are disposed on the same plane, and the transmitting piezoelectric resonator and the receiving piezoelectric resonator satisfy $(g_{33r} \cdot V_r \cdot Q_r)/(g_{33t} \cdot V_t \cdot Q_t) \geq n \cdot (1+R)$, in which $g_{33t}$ and $V_t$ denote a voltage output coefficient and a sound velocity of the transmitting piezoelectric resonator, $g_{33r}$ and $V_r$ denote a voltage output coefficient and a sound velocity of the receiving piezoelectric resonator, n denotes a harmonic order, R denotes an opening area ratio (an opening area of the receiving piezoelectric resonator/an opening area of the transmitting piezoelectric resonator), and $Q_t$ and $Q_r$ denote resonance sharpness of the transmitting ultrasonic vibrator and the receiving ultrasonic vibrator, respectively.

28. The ultrasonic transducer according to claim 27, wherein in said transmitting ultrasonic vibrator, a mechanical resonance sharpness Q in the center frequency is between 1 and 5.

29. The ultrasonic transducer according to claim 28, wherein a material of the transmitting piezoelectric resonator has a piezoelectric constant $d_{33}$ which satisfies $d_{33} > 200 \times 10^{-12}$ [m/V], and a mechanical quality factor Qm which satisfies 70<Qm<1000.

30. The ultrasonic transducer according to claim 28, wherein said transmitting ultrasonic vibrator further comprises a backing layer disposed on the back surface of the transmitting piezoelectric resonator, and the backing layer has an ultrasonic attenuation ratio larger than 5 dB/cm/MHz, and an acoustic impedance Zd which is ⅓ or less of an acoustic impedance Zp of the transmitting piezoelectric resonator.

31. The ultrasonic transducer according to claim 28, wherein said transmitting piezoelectric resonator comprises an energy trapped electrode.

32. The ultrasonic transducer according to claim 27, wherein said receiving ultrasonic vibrator has a center frequency of $2f_0$, and a mechanical resonance sharpness Q in the center frequency is between 1 and 5.

33. The ultrasonic transducer according to claim 27, wherein said receiving ultrasonic vibrator has a center frequency of $3f_0$, and a mechanical resonance sharpness Q in the center frequency is between 1 and 5.

34. The ultrasonic transducer according to claim 32 or 33, wherein a piezoelectric material of the receiving piezoelectric resonator has a high voltage output coefficient $g_{33}$, and a high longitudinal wave sound velocity.

35. The ultrasonic transducer according to claim 34, wherein the material having the high voltage output coefficient $g_{33}$ and the high longitudinal wave sound velocity is a piezoelectric single crystal represented by a chemical formula $K(Nb_{1-x}Ta_x)O_3$, $0 \leq x \leq 0.2$.

36. The ultrasonic transducer according to claim 34, wherein the material having the high voltage output coefficient $g_{33}$ and the high longitudinal wave sound velocity is a lead titanate based piezoelectric ceramic.

37. The ultrasonic transducer according to claim 34, wherein the material having the high voltage output coefficient $g_{33}$ and the high longitudinal wave sound velocity is a bismuth layer structure ferroelectric material (BLSF) represented by a chemical formula $Bi_4Ti_3O_{12}$ or $Ma_{1-x}Mb_xBi_2McO_8$, $0 \leq x \leq 0.2$, in which Ma and Mb are alkaline earth metal elements such as Sr and Ba, and Mc is a +5 valence metal element such as Ta and Nb.

38. The ultrasonic transducer according to claim 32, wherein said receiving piezoelectric resonator comprises an energy trapped electrode.

39. The ultrasonic transducer according to claim 32, wherein said receiving ultrasonic vibrator comprises a backing layer disposed on the back surface of the receiving piezoelectric resonator, and a material of the backing layer has an ultrasonic attenuation ratio larger than 5 dB/cm/MHz, and an acoustic impedance Zd which is ⅓ or less of an acoustic impedance Zp of the receiving piezoelectric resonator.

40. An ultrasonic transducer system for harmonic imaging, comprising:

an ultrasonic transducer comprising a transmitting ultrasonic vibrator for transmitting a fundamental ultrasound having a center frequency $f_0$ in response to input of an electric signal and a receiving ultrasonic vibrator for receiving a harmonic signal having a center frequency $nf_0$ (n is an integer of 2 or more) generated in an object by the fundamental ultrasound, said transmitting ultrasonic vibrator comprising a transmitting piezoelectric resonator, said receiving ultrasonic vibrator comprising a receiving piezoelectric resonator, said transmitting piezoelectric resonator and said receiving piezoelectric resonator being disposed on the same plane, said transmitting piezoelectric resonator and said receiving piezoelectric resonator satisfying $(g_{33r} \cdot V_r \cdot Q_r)/(g_{33t} \cdot V_t \cdot Q_t) \geq n \cdot (1+R)$, in which $g_{33t}$ and $V_t$ denote a voltage output coefficient and a sound velocity of the transmitting piezoelectric resonator, $g_{33r}$ and Vr denote a voltage output coefficient and a sound velocity of the receiving piezoelectric resonator, n denotes a harmonic order, R denotes an opening area ratio (an opening area of the receiving piezoelectric resonator/an opening area of the transmitting piezoelectric resonator), and $Q_t$ and $Q_r$ denote resonance sharpness of the transmitting ultrasonic vibrator and the receiving ultrasonic vibrator, respectively; and drive control means for driving/controlling the ultrasonic transducer, wherein said drive control means generates an ultrasound in which at least a component of $2f_0$ is inhibited in the transmitting ultrasonic vibrator.

41. The ultrasonic transducer system according to claim 40, wherein said drive control means supplies a drive pulse signal having a frequency characteristic such that the center frequency is in $f_0$ and a first dip frequency is in $2f_0$ to the transmitting ultrasonic vibrator.

42. The ultrasonic transducer system according to claim 41, wherein said drive control means supplies the drive pulse signal of a burst wave to the transmitting ultrasonic vibrator.

43. The ultrasonic transducer system according to claim 40, wherein said transmitting ultrasonic vibrator comprises means for imparting a functionally gradient characteristic concerning at least one of a piezoelectric constant and a permittivity to the transmitting piezoelectric resonator.

44. The ultrasonic transducer system according to claim 43, wherein said means for imparting the functionally gradient characteristic comprises a heater for imparting a temperature gradient to the transmitting piezoelectric resonator along a thickness direction of the transmitting piezoelectric resonator.

45. The ultrasonic transducer system according to claim 40, wherein said transmitting piezoelectric resonator has an functionally gradient characteristic in at least one of a piezoelectric constant and a permittivity.

46. The ultrasonic transducer system according to claim 45, wherein said transmitting piezoelectric resonator has an inclination piezoelectric material in which at least one of the piezoelectric constant and the permittivity monotonously changes along a thickness direction.

47. The ultrasonic transducer system according to claim 45, wherein said transmitting piezoelectric resonator comprises a plurality of piezoelectric thin plates being laminated on one another and having the functionally gradient characteristic in which at least one of the piezoelectric constant and the permittivity gradually differs.

* * * * *